United States Patent
Saito et al.

(10) Patent No.: US 9,363,429 B2
(45) Date of Patent: Jun. 7, 2016

(54) IMAGING APPARATUS AND ITS CONTROL METHOD

(71) Applicant: CANON KABUSHIKI KAISHA, Tokyo (JP)

(72) Inventors: Junichi Saito, Kawasaki (JP); Hideaki Takamiya, Yokohama (JP); Yoshihito Tamaki, Yokohama (JP); Yuki Yoshimura, Tokyo (JP); Koichi Fukuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/589,357

(22) Filed: Jan. 5, 2015

(65) Prior Publication Data

US 2015/0195446 A1    Jul. 9, 2015

(30) Foreign Application Priority Data

Jan. 7, 2014 (JP) ................. 2014-001065

(51) Int. Cl.
*H04N 5/232* (2006.01)
*G03B 13/36* (2006.01)
*G02B 7/34* (2006.01)

(52) U.S. Cl.
CPC .............. *H04N 5/23212* (2013.01); *G02B 7/34* (2013.01); *G03B 13/36* (2013.01); *H04N 5/23219* (2013.01)

(58) Field of Classification Search
None
See application file for complete search history.

(56) References Cited

U.S. PATENT DOCUMENTS

| 7,283,737 | B2* | 10/2007 | Ohmura | G02B 7/34 396/111 |
| 7,873,267 | B2* | 1/2011 | Kusaka | G02B 7/36 348/345 |
| 7,983,550 | B2* | 7/2011 | Maeda | G02B 7/38 396/123 |
| 8,094,999 | B2* | 1/2012 | Ohnishi | G02B 7/38 396/113 |
| 8,405,760 | B2* | 3/2013 | Yamasaki | G03B 3/10 348/280 |
| 8,537,264 | B2* | 9/2013 | Ono | H04N 5/23212 348/335 |
| 8,576,329 | B2* | 11/2013 | Takamiya | G02B 7/34 348/349 |

(Continued)

FOREIGN PATENT DOCUMENTS

JP    2013-025246 A    2/2013

*Primary Examiner* — Michael Osinski
(74) *Attorney, Agent, or Firm* — Cowan, Liebowitz & Latman, P.C.

(57) ABSTRACT

An imaging apparatus includes an imaging plane phase-difference type first focus detecting unit and a contrast type second focus detecting unit. A saturation detecting unit detects saturation of focus detecting pixels or imaging pixels provided in an imaging element. A brightness detecting unit detects the brightness of an object. If the number of pixels detected by the saturation detecting unit exceeds a predetermined value or the brightness of an object detected by the brightness detecting unit is less than a predetermined value, a CPU controls a focus adjustment operation only using a first detection amount. Alternatively, the CPU controls a focus adjustment operation based on the result obtained by weighting processing of a first detection amount and a second detection amount in response to an increase in the number of pixels of which saturation of the outputs has been detected or a decrease in the brightness of an object.

5 Claims, 19 Drawing Sheets

(56) References Cited

U.S. PATENT DOCUMENTS

| | | | |
|---|---|---|---|
| 8,633,992 B2* | 1/2014 | Tsukada | G02B 7/38 348/208.12 |
| 8,767,118 B2* | 7/2014 | Yamasaki | G03B 3/10 348/349 |
| 2002/0036257 A1* | 3/2002 | Yamashita | H04N 5/23212 250/208.1 |
| 2004/0090550 A1* | 5/2004 | Park | H04N 9/045 348/350 |
| 2004/0125229 A1* | 7/2004 | Aoyama | H04N 5/23212 348/345 |
| 2004/0202461 A1* | 10/2004 | Nakahara | G02B 7/285 396/104 |
| 2005/0001924 A1* | 1/2005 | Honda | H04N 5/23212 348/348 |
| 2005/0280735 A1* | 12/2005 | Nakahara | H04N 5/23212 348/345 |
| 2007/0102619 A1* | 5/2007 | Kusaka | G02B 7/285 250/201.2 |
| 2007/0132877 A1* | 6/2007 | Bok | G02B 7/36 348/345 |
| 2007/0154200 A1* | 7/2007 | Utagawa | H04N 9/045 396/111 |
| 2007/0206937 A1* | 9/2007 | Kusaka | G02B 7/102 396/89 |
| 2007/0269197 A1* | 11/2007 | Ide | G02B 7/34 396/125 |
| 2008/0198257 A1* | 8/2008 | Morimoto | G03B 13/00 348/345 |
| 2008/0240701 A1* | 10/2008 | Kusaka | G02B 7/36 396/104 |
| 2008/0259202 A1* | 10/2008 | Fujii | H04N 5/23212 348/345 |
| 2008/0302947 A1* | 12/2008 | Utagawa | G02B 7/32 250/201.8 |
| 2009/0135289 A1* | 5/2009 | Kusaka | G02B 3/0056 348/345 |
| 2010/0013947 A1* | 1/2010 | Oikawa | H04N 5/23212 348/222.1 |
| 2010/0026877 A1* | 2/2010 | Koh | G02B 7/36 348/345 |
| 2010/0149389 A1* | 6/2010 | Goto | G02B 7/34 348/280 |
| 2010/0150539 A1* | 6/2010 | Kusaka | G03B 13/28 396/125 |
| 2010/0232776 A1* | 9/2010 | Ohnishi | H04N 5/23212 396/104 |
| 2010/0309365 A1* | 12/2010 | Inoue | G02B 7/102 348/345 |
| 2011/0001869 A1* | 1/2011 | Hamano | G03B 13/18 348/347 |
| 2011/0013894 A1* | 1/2011 | Takaiwa | G03B 17/00 396/48 |
| 2011/0102596 A1* | 5/2011 | Kotani | G06T 7/0065 348/159 |
| 2011/0205423 A1* | 8/2011 | Tsukada | G02B 7/38 348/345 |
| 2011/0228145 A1* | 9/2011 | Kimura | G02B 7/102 348/247 |
| 2011/0305445 A1* | 12/2011 | Yasuda | H04N 5/23212 396/78 |
| 2012/0033115 A1* | 2/2012 | Fujii | G02B 5/201 348/280 |
| 2012/0044406 A1* | 2/2012 | Shimoda | G02B 7/365 348/345 |
| 2012/0092545 A1* | 4/2012 | Sugawara | G02B 7/285 348/345 |
| 2012/0133813 A1* | 5/2012 | Nagano | H04N 5/3696 348/311 |
| 2012/0133821 A1* | 5/2012 | Takaiwa | H04N 5/23212 348/345 |
| 2012/0147245 A1* | 6/2012 | Iijima | H04N 5/23212 348/333.11 |
| 2012/0147255 A1* | 6/2012 | Yasuda | G03B 3/10 348/352 |
| 2012/0169917 A1* | 7/2012 | Isobe | G02B 7/08 348/345 |
| 2012/0176532 A1* | 7/2012 | Hara | G03B 13/36 348/352 |
| 2012/0249846 A1* | 10/2012 | Nishio | H01L 27/14603 348/294 |
| 2012/0301044 A1* | 11/2012 | Nakada | H04N 5/23229 382/255 |
| 2012/0321203 A1* | 12/2012 | Yamashita | G06T 5/005 382/224 |
| 2013/0021499 A1* | 1/2013 | Ui | G03B 13/36 348/238 |
| 2013/0021517 A1* | 1/2013 | Ui | H04N 5/3696 348/345 |
| 2013/0063571 A1* | 3/2013 | Ishii | G06T 15/205 348/47 |
| 2013/0182900 A1* | 7/2013 | Ishii | H04N 5/23212 382/103 |
| 2013/0235253 A1* | 9/2013 | Onuki | H04N 5/23212 348/349 |
| 2013/0242172 A1* | 9/2013 | Hamano | H04N 5/23212 348/349 |
| 2013/0329120 A1* | 12/2013 | Hiasa | H04N 5/23212 348/345 |
| 2014/0002706 A1* | 1/2014 | Ishii | G02B 7/08 348/308 |
| 2014/0049666 A1* | 2/2014 | Tsutsumi | H04N 5/23212 348/239 |
| 2014/0118610 A1* | 5/2014 | Ohara | H04N 5/23212 348/349 |
| 2014/0139725 A1* | 5/2014 | Nagano | H04N 5/23212 348/354 |
| 2014/0146221 A1 | 5/2014 | Kimura et al. | |
| 2014/0176784 A1* | 6/2014 | Hongu | H04N 5/23212 348/349 |
| 2014/0192220 A1* | 7/2014 | Kimura | G02B 7/34 348/222.1 |
| 2014/0192249 A1* | 7/2014 | Kishi | H04N 5/23212 348/349 |
| 2014/0198245 A1* | 7/2014 | Kunugi | H04N 5/23212 348/349 |
| 2014/0204241 A1* | 7/2014 | Ohara | H04N 5/243 348/223.1 |
| 2014/0267839 A1* | 9/2014 | Nishimaki | H04N 5/367 348/246 |
| 2014/0300802 A1* | 10/2014 | Hamano | H04N 5/23212 348/354 |
| 2014/0307134 A1* | 10/2014 | Kanda | H04N 5/23212 348/280 |
| 2014/0320711 A1* | 10/2014 | Fukuda | H04N 5/23212 348/294 |
| 2014/0340543 A1* | 11/2014 | Nakada | H04N 5/23229 348/239 |
| 2014/0340567 A1* | 11/2014 | Fukuda | H04N 5/23212 348/353 |
| 2014/0354781 A1* | 12/2014 | Matsuyama | H04N 5/23212 348/49 |
| 2015/0062389 A1* | 3/2015 | Takeuchi | H04N 5/23212 348/273 |
| 2015/0109409 A1* | 4/2015 | Isogai | H04N 13/0011 348/43 |
| 2015/0109515 A1* | 4/2015 | Kobuse | H04N 5/23212 348/349 |
| 2015/0130987 A1* | 5/2015 | Nakagawa | H04N 5/23212 348/349 |
| 2015/0130988 A1* | 5/2015 | Uenishi | H04N 5/23212 348/349 |
| 2015/0146052 A1* | 5/2015 | Sawadaishi | G02B 7/34 348/266 |
| 2015/0271475 A1* | 9/2015 | Shibuno | H04N 5/23212 348/46 |

* cited by examiner

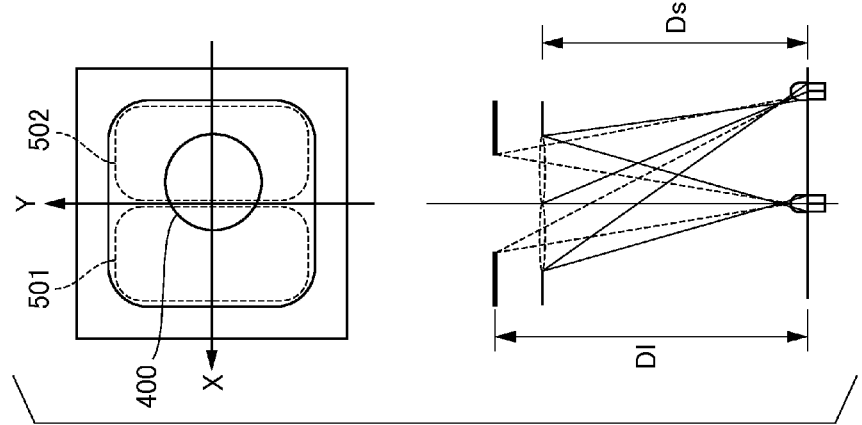
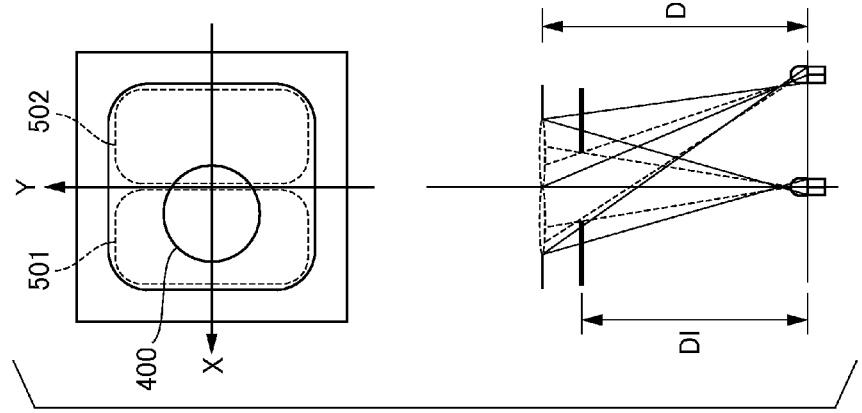
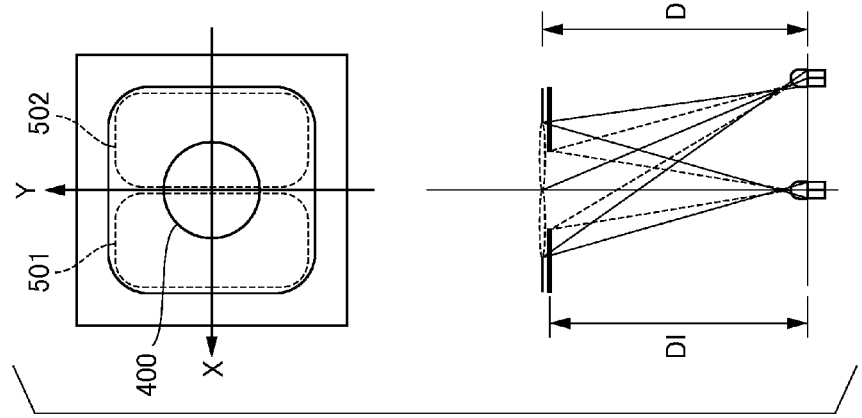

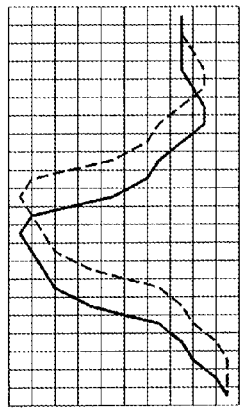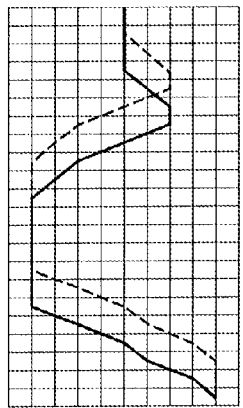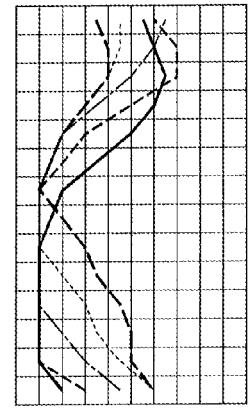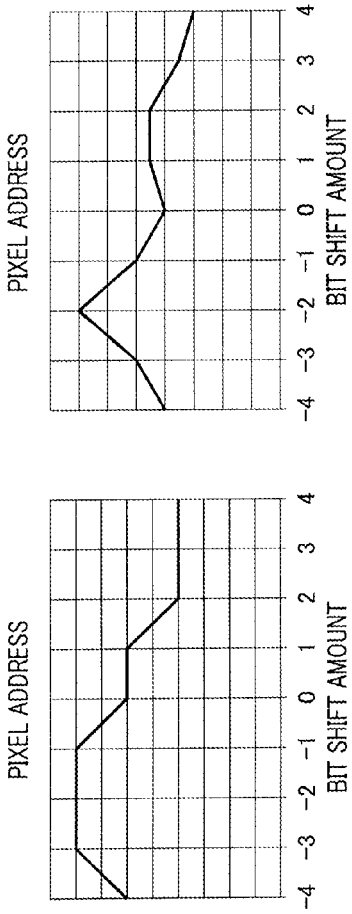
FIG. 16A. FOCUS DETECTION SIGNAL
FIG. 16B. SHIFT SUMMATION SIGNAL
FIG. 16C. CONTRAST EVALUATION VALUE

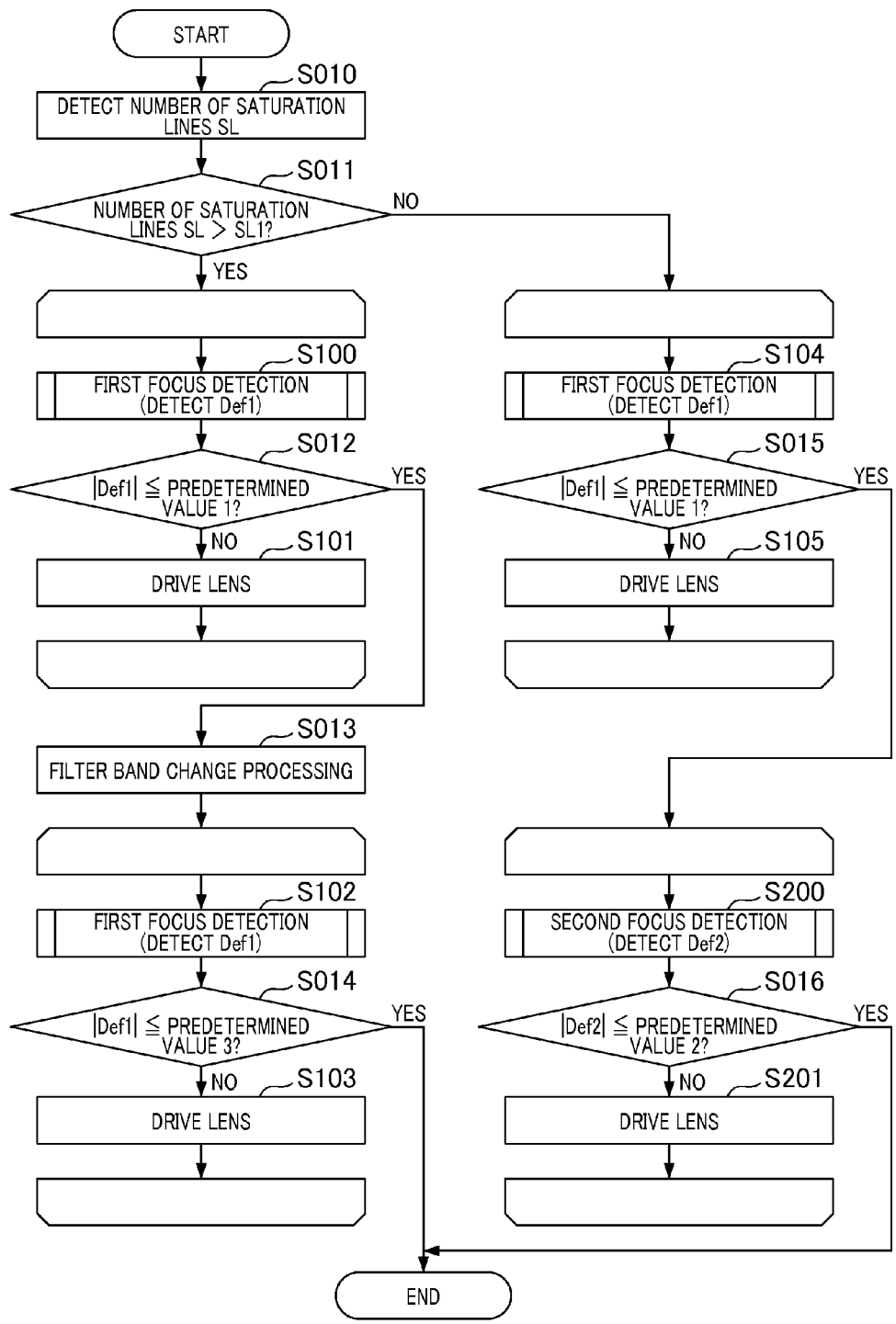

IMAGING APPARATUS AND ITS CONTROL METHOD

BACKGROUND OF THE INVENTION

1. Field of the Invention

The present invention relates to an imaging apparatus and its control method, and particularly relates to auto focus (hereinafter abbreviated as "AF") control based on a photoelectric conversion signal output from an imaging element.

2. Description of the Related Art

One focus detection method performed by an imaging apparatus is an imaging plane phase-difference type method that detects a focus state using focus detecting pixels formed in an imaging element. Another focus detection method performed by an imaging apparatus is a contrast type method that detects a focus state using a contrast evaluation value based on a shot imaging signal output from an imaging element.

Japanese Patent Laid-Open No. 2013-25246 discloses an imaging plane phase-difference type imaging apparatus that includes a contrast evaluating unit and a correlation calculating unit and compares two absolute values of focus evaluation ranges obtained from these units to thereby determine the focus evaluation value of an object by the comparison result. The contrast evaluating unit determines a contrast focus position based on the contrast evaluation value of a signal obtained by shift summation of imaging signals from different pupil areas. Thus, a focus position can be specified without actually driving a focus lens for AF control.

However, Japanese Patent Laid-Open No. 2013-25246 does not disclose any concrete solution against a low-brightness object which is disadvantageous for the contrast evaluating unit as compared with the correlation calculating unit and the result evaluation under a saturation condition. Thus, it may become difficult to perform shooting in an in-focus state if focus detection cannot be performed by the contrast evaluating unit.

SUMMARY OF THE INVENTION

The present invention provides an imaging apparatus that can detect a focus state with accuracy under the condition of shooting a low-brightness object or the condition including a saturated pixel and its control method.

According to an aspect of the present invention, an imaging apparatus is provided that includes an imaging element having a plurality of focus detecting pixels for receiving light passing through different partial pupil areas of an focusing optical system; a control unit configured to control a focus adjustment operation using detection signals from the plurality of focus detecting pixels; a signal generating unit configured to generate a plurality of focus detection signals from signals received by the plurality of focus detecting pixels; a first focus detecting unit configured to calculate a correlation amount by performing first filter processing and first shift processing to the plurality of focus detection signals and output a signal of a first detection amount obtained from the correlation amount; a second focus detecting unit configured to calculate a contrast evaluation value by generating a shift summation signal obtained by the summation of second filter processing and second shift processing to the plurality of focus detection signals and output a signal of a second detection amount obtained from the contrast evaluation value; and a saturation detecting unit configured to detect saturation of the outputs of the plurality of focus detecting pixels or a brightness detecting unit configured to detect the brightness of an object from an image captured by the imaging element.

In the imaging apparatus according to a first aspect of the present invention, if the number of focus detecting pixels of which the saturation detecting unit detects the saturation of the outputs exceeds a threshold value, the control unit controls a focus adjustment operation using the first detection amount, whereas if the number of focus detecting pixels of which the saturation detecting unit detects the saturation of the outputs is equal to or less than a threshold value, the control unit controls a focus adjustment operation using the first detection amount and the second detection amount.

In the imaging apparatus according to a second aspect of the present invention, the control unit calculates a third detection amount by performing a weighting processing of the first detection amount and the second detection amount using a weighted coefficient determined from the number of pixels in which saturation of the outputs of imaging pixels including the plurality of focus detecting pixels or the plurality of focus detecting pixels has been detected by the saturation detecting unit and controls the focus adjustment operation using the third detection amount.

In the imaging apparatus according to a third aspect of the present invention, if the brightness level detected by the brightness detecting unit is less than a threshold value, the control unit controls a focus adjustment operation using the first detection amount, whereas if the brightness level detected by the brightness detecting unit is equal to or greater than a threshold value, the control unit controls a focus adjustment operation using the first detection amount and the second detection amount.

In the imaging apparatus according to a fourth aspect of the present invention, the control unit calculates a third detection amount by performing a weighting processing of the first detection amount and the second detection amount using a weighted coefficient determined from the brightness of an object detected by the brightness detecting unit and controls the focus adjustment operation using the third detection amount.

According to the present invention, a focus state can be detected with accuracy under the condition of shooting a low-brightness object or the condition including a saturated pixel.

Further features of the present invention will become apparent from the following description of exemplary embodiments with reference to the attached drawings.

BRIEF DESCRIPTION OF THE DRAWINGS

FIGS. 7A to 7C are schematic explanatory views each illustrating shading caused by a pupil shift between a first focus detection signal and a second focus detection signal.

FIGS. 16A to 16C are schematic views each illustrating the difference between second detection defocus amounts due to presence/absence of a saturated signal.

FIG. 17 is a flowchart illustrating focus detection processing corresponding to the number of lines including a saturated signal.

DESCRIPTION OF THE EMBODIMENTS

Hereinafter, preferred embodiments of the present invention will be described in detail with reference to the accompanying drawings.

First Embodiment

Figure 1:
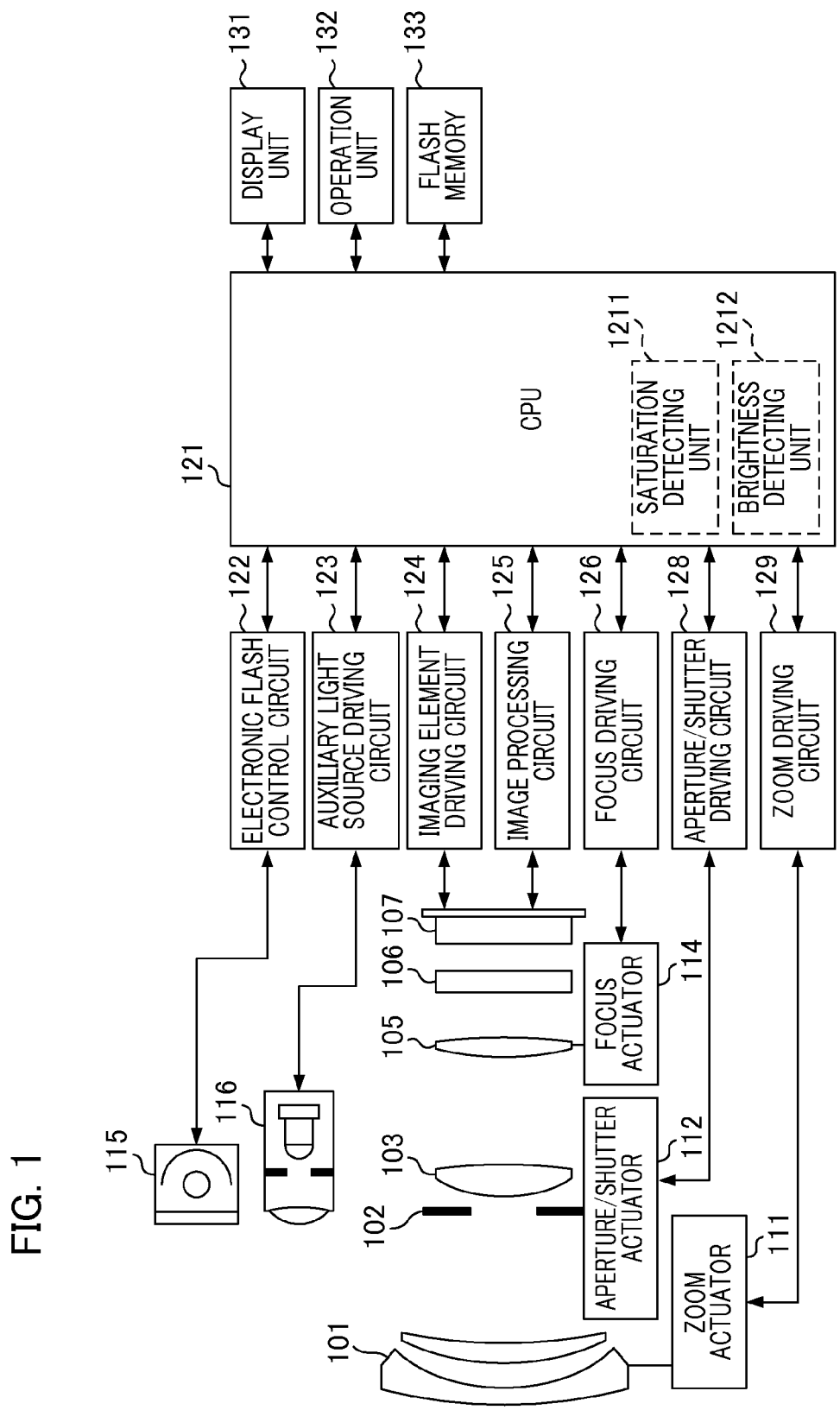
FIG. 1 is a schematic block view illustrating an example of a configuration of an imaging apparatus in order to explain a first embodiment of the present invention in conjunction with FIGS. 2 to 18.

FIG. 1 is a block view illustrating an example of a configuration of an imaging apparatus according to a first embodiment of the present invention. A first lens group 101 which is arranged at the distal end of the imaging optical system (focusing optical system) is held so as to be extendable and retractable in the optical axis direction in the lens barrel. An aperture shutter 102 adjusts the aperture diameter to adjust the light quantity when shooting. The aperture shutter 102 also functions as a shutter for adjusting the exposure time when shooting a still image. The aperture shutter 102 and a second lens group 103 advance and retract together in the optical axis direction to achieve a zooming operation (zooming function) in synchronism with the reciprocal operation of the first lens group 101. A third lens group 105 is a focus lens for focusing by advancing and retracting in the optical axis direction. An optical low-pass filter 106 is an optical element for reducing the false color or moiré of a shot image. An imaging element 107 consists of a two-dimensional CMOS (Complementary Metal Oxide Semiconductor) photo sensor and its peripheral circuit and is arranged on the imaging surface of the imaging optical system.

A zoom actuator 111 performs the zooming operation by rotating a cam cylinder (not shown) to cause the first lens group 101 and the second lens group 103 to move in the optical axis direction. An aperture/shutter actuator 112 controls the aperture diameter of the aperture shutter 102 to adjust the light quantity when shooting, and controls the exposure time when shooting a still image. A focus actuator 114 performs the focus adjustment operation by moving the third lens group 105 in the optical axis direction.

An electronic flash 115 is used to illuminate an object when shooting. The electronic flash 115 is preferably a flash illumination device using a xenon tube but may also be an illumination device having a continuous emission LED (Light Emitting Diode). An AF auxiliary light source 116 improves the focus detection capability for a low-brightness object or low-contrast object. The AF auxiliary light source 116 projects an image of a mask having a predetermined aperture pattern to the field via a projection lens.

A CPU (Central Processing Unit) 121 which constitutes the control unit of a camera system has a control central function which carries out the various types of control. The CPU 121 includes an arithmetic unit, a ROM (Read Only Memory), a RAM (Random Access Memory), an A (Analog)/D (digital) converter, a D/A converter, a communication interface circuit, and the like. The CPU 121 drives various circuits incorporated in the camera on the basis of a predetermined program stored in the ROM to execute a series of operations including AF control, shooting, image processing, record processing, and the like. The CPU 121 also has a saturation detecting unit 1211 and a brightness detecting unit 1212 which are realized by executing a control program. The saturation detecting unit 1211 detects the saturation state of the brightness outputs of the pixel signals acquired by the imaging element 107. The brightness detecting unit 1212 detects the brightness of an object, and a brightness detection signal is used for determination upon AF control.

An electronic flash control circuit 122 controls the ON operation of the electronic flash 115 in synchronism with the shooting operation in accordance with the control command of the CPU 121. An auxiliary light source driving circuit 123 controls the ON operation of the AF auxiliary light unit 116 in synchronism with the focus detection operation in accordance with the control command of the CPU 121. An imaging element driving circuit 124 controls the imaging operation of the imaging element 107, A/D-converts an acquired imaging signal, and transits the digital data to the CPU 121. An image processing circuit 125 performs processes such as γ conversion, color interpolation, JPEG (Joint Photographic Experts Group) compression, and the like for an image obtained by the imaging element 107.

A focus driving circuit 126 carries out control to drive the focus actuator 114 on the basis of the focus detection result in accordance with the control command of the CPU 121, and move the third lens group 105 in the optical axis direction, thereby adjusting the focus. An aperture/shutter driving circuit 128 carries out control to drive the aperture/shutter actuator 112 in accordance with the control command of the CPU 121, whereby the diameter of the aperture shutter 102 is controlled. A zoom driving circuit 129 drives the zoom actuator 111 in accordance with the zooming operation instruction of the photographer in accordance with the control command of the CPU 121.

A display unit 131 has a display device such as an LCD (Liquid Crystal Display) or the like, and displays information on the shooting mode of the camera, a preview image before shooting, a confirmation image after shooting, an in-focus display image upon focus detection, and the like. An operation unit 132 includes a power switch, release (shooting trigger) switch, zooming operation switch, shooting mode selection switch, and the like as operation switches and outputs an operation instruction signal to the CPU 121. A flash memory 133 is a storage medium removable from a camera main body and records shot image data or the like.

Figure 2:
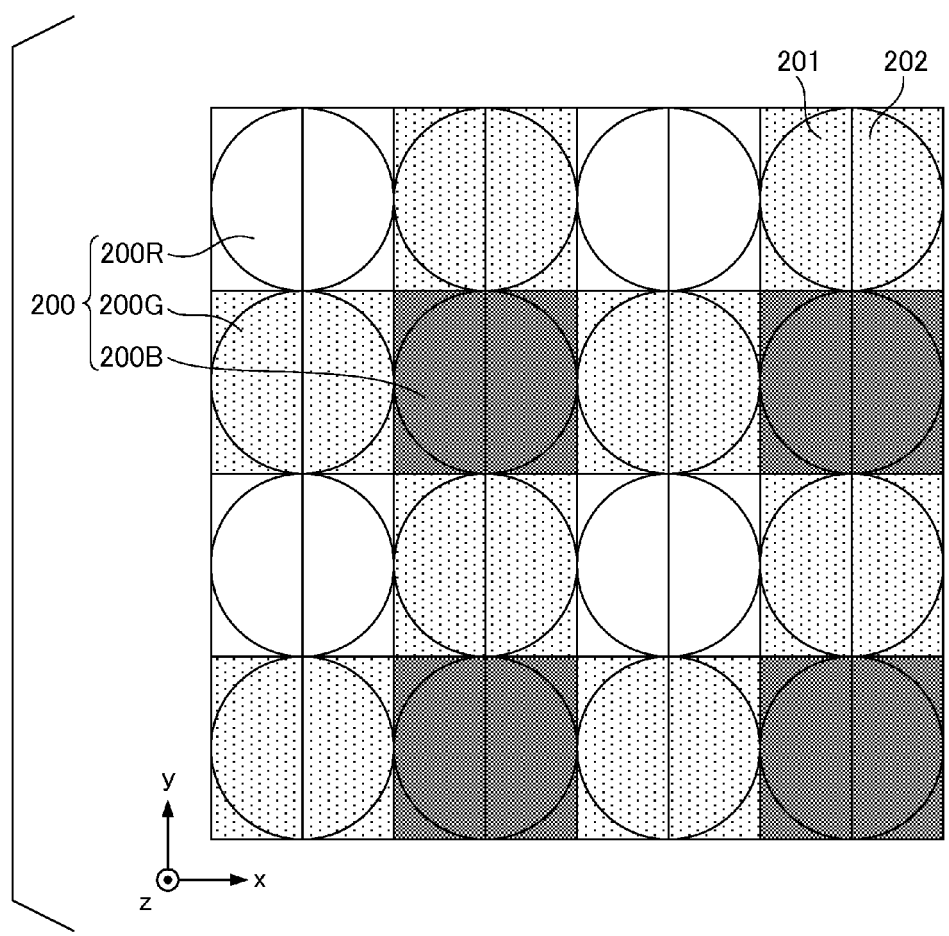
FIG. 2 is a schematic view illustrating the pixel array of an imaging element.

Next, a description will be given of an array of imaging pixels and focus detecting pixels formed on an imaging element according to the present embodiment with reference to FIG. 2. FIG. 2 illustrates an imaging pixel array of a two-dimensional CMOS sensor (imaging element) in a 4-column by 4-row range, and a focus detecting pixel array in an 8-column by 4-row range. A 2-column by 2-row pixel group 200 includes a set of pixels 200R, 200G, and 200B to be described below.

Pixel 200R (see upper left position): a pixel having a spectral sensitivity of R (Red).

Pixels 200G (see upper right and lower left positions): pixels having a spectral sensitivity of G (Green).

Pixel 200B (see lower right position): a pixel having a spectral sensitivity of B (Blue).

Each pixel is constituted by a first focus detecting pixel 201 and a second focus detecting pixel 202 which are arranged in a 2-column by 1-row array. The 4-column by 4-row pixels (8-column by 4-row focus detecting pixels) shown in FIG. 2 is arranged in plural in a grid pattern on a plane, so that captured imaging signals and focus detection signals can be acquired. In the imaging element described in the present embodiment, a pixel cycle P=4 (μm) and the number of pixels N is 5,575 horizontal columns by 3,725 vertical rows (about 20,750 thousand pixels). The cycle of focus detecting pixels in the column direction $P_{AF}$=2 (μm) and the number of focus detection pixels $N_{AF}$ is 11,150 horizontal columns by 3,725 vertical rows (about 41,500 thousand pixels).

Figure 3A:
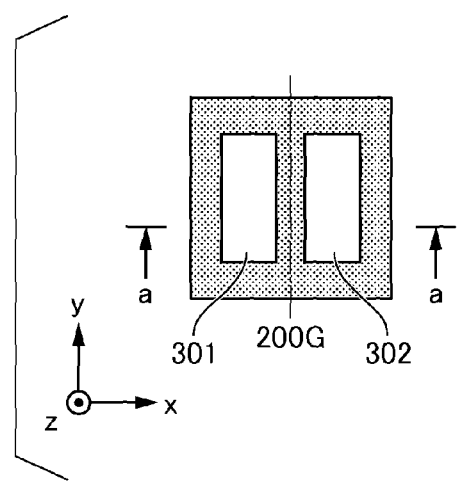
FIG. 3A is a schematic plan view illustrating a pixel.
Figure 3B:
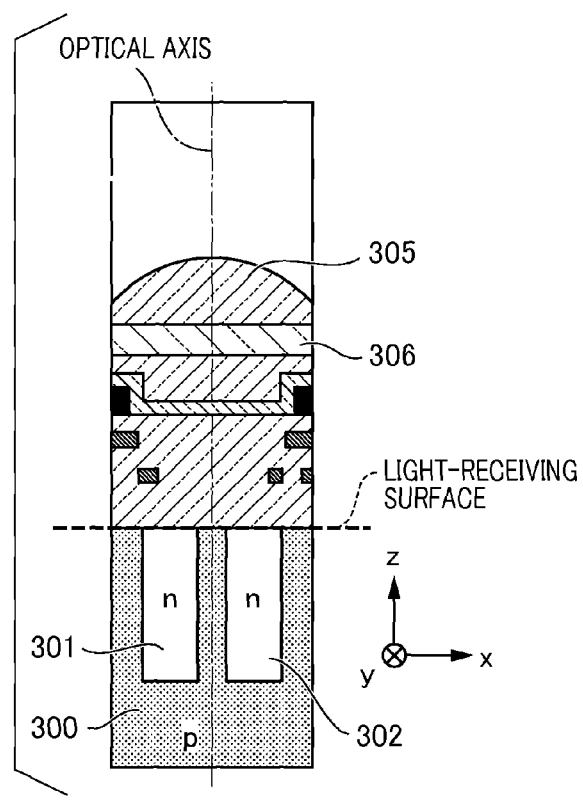
FIG. 3B is a schematic cross-sectional view illustrating a pixel.

FIG. 3A shows a plane view of a pixel 200G of the imaging element shown in FIG. 2 as viewed from the light-receiving surface side (+z side) of the imaging element. The z-axis is set in a direction vertical to the sheet of FIG. 3A, and the direction toward the user is defined as the positive direction of the z-axis. The y-axis is set in a vertical direction orthogonal to the z-axis and the upward direction is defined as the positive direction of the y-axis. The x-axis is set in a horizontal direction orthogonal to the z-axis and the y-axis and the rightward direction is defined as the positive direction of the x-axis. FIG. 3B shows a cross-sectional view along a cut line a-a in FIG. 3A as viewed from −y side.

As shown in FIG. 3B, a microlens 305 for collecting incident light is formed on the light-receiving surface side (+z direction) of each pixel and the pixel 200G includes a plurality of divided photoelectric conversion units. For example, the number of division in the x-direction is defined as $N_H$ and the number of division in the y-direction is defined as $N_V$. FIGS. 3A and 3B show an example in which a pupil area is divided into two areas in the horizontal direction, i.e., the case where $N_H$=2 and $N_V$=1, where a photoelectric conversion unit 301 and a photoelectric conversion unit 302 are formed as sub-pixels. The photoelectric conversion unit 301 corresponds to the first focus detecting pixel 201, and the photoelectric conversion unit 302 corresponds to the second focus detecting pixel 202. The photoelectric conversion units 301 and 302 are formed as pin structure photodiodes with an intrinsic layer interposed between a p-type layer 300 and an n-type layer. The photoelectric conversion units 301 and 302 may also be formed as pn junction photodiodes while omitting an intrinsic layer as necessary. In each pixel, a color filter 306 is provided between the microlens 305 and both of the photoelectric conversion unit 301 and the photoelectric conversion unit 302. As necessary, the spectrum transmissivity of the color filter 306 may be changed for each sub-pixel, or the color filter may be omitted.

Light incident on the pixel 200G is gathered by the microlens 305, dispersed by the color filter 306, and then received by the photoelectric conversion unit 301 and the photoelectric conversion unit 302. In the photoelectric conversion unit 301 and the photoelectric conversion unit 302, an electron and a hole (positive hole) are generated through pair production according to a light-receiving amount and separated by a depletion layer, and thereafter, electrons having a negative charge are accumulated in an n-type layer (not shown). On the other hand, holes are discharged outside the imaging element through a p-type layer connected to a constant voltage source (not shown). Electrons accumulated in the n-type layer (not shown) of the photoelectric conversion unit 301 and the photoelectric conversion unit 302 are transferred to a capacitance unit (FD) via a transfer gate and then converted into a voltage signal.

Figure 4:
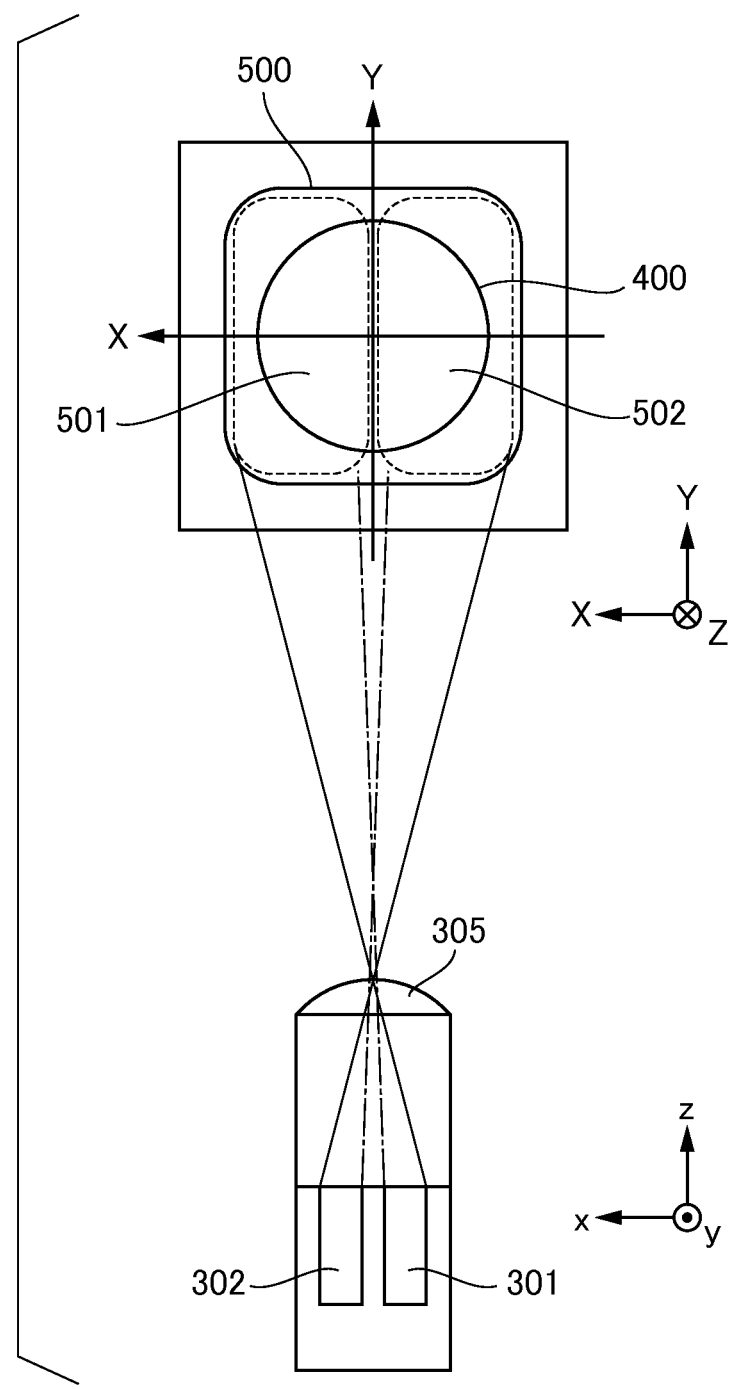
FIG. 4 is a schematic view illustrating the relationship between a pixel and pupil division.

FIG. 4 is a schematic explanatory view illustrating the correspondence relationship between the pixel structure and the pupil division. FIG. 4 shows a cross-sectional view of an a-a cross-sectional surface of the pixel structure shown in FIG. 3A as viewed from a +y side and an exit pupil plane (see the exit pupil 400) of the focusing optical system as viewed from a −z side. In FIG. 4, in order to correspond to a coordinate axis of the exit pupil plane, the x and y axes in the cross-sectional view are reversed with respect to FIGS. 3A and 3B. By the microlens 305, a first partial pupil area 501 corresponding to the first focus detecting pixel 201 has a substantially conjugating relationship with the light-receiving surface of the photoelectric conversion unit 301 of which the center of gravity is biased to the −x direction. In other words, the first partial pupil area 501 represents a pupil area that can receive light over the first focus detecting pixel 201 and of which the center of gravity is eccentric in the +x direction on the pupil plane. By the microlens 305, a second partial pupil area 502 corresponding to the second focus detecting pixel 202 has a substantially conjugating relationship with the light-receiving surface of the photoelectric conversion unit 302 of which the center of gravity is eccentric in the +x direction. In other words, the second partial pupil area 502 represents a pupil area that can receive light over the second focus detecting pixel 202 and of which the center of gravity is biased to the −x direction on the pupil plane.

A pupil area 500 shown in FIG. 4 is such a pupil area that can receive light over the entire pixel 200G when all the photoelectric conversion unit 301 and the photoelectric conversion unit 302 (the first focus detecting pixel 201 and the second focus detecting pixel 202) are combined together. A correspondence relationship between the imaging element and the pupil division is shown in the schematic view in FIG. 5A. Light passing through the different partial pupil areas of the first partial pupil area 501 and the second partial pupil area 502 is incident on the pixels of the imaging element at different angles. Incident light is received by the photoelectric conversion unit 301 of the first focus detecting pixel 201 and the photoelectric conversion unit 302 of the second focus detecting pixel 202 which are divided into $N_H$ (=2)×$N_V$ (=1) and is photoelectrically converted thereby.

As described above, the imaging element 107 according to the present embodiment includes a first focus detecting pixel for receiving light passing through a first partial pupil area of the focusing optical system and a second focus detecting pixel for receiving light passing through a second partial pupil area, which is different from the first partial pupil area, of the focusing optical system. An imaging pixel for receiving light passing through the combined pupil area of the first partial pupil area and the second partial pupil area of the focusing optical system is arranged in a two-dimensional plural array. In other words, each imaging pixel is constituted by the first focus detecting pixel and the second focus detecting pixel. Note that, if required, the imaging pixel may be configured independently of the first focus detecting pixel and the second focus detecting pixel such that the first focus detecting pixel and the second focus detecting pixel are partially in a dispersed arrangement in an imaging pixel array.

The light-receiving signals of the first focus detecting pixels 201 of pixels in the imaging element are aggregated to thereby generate a first focus detection signal and the light-receiving signals of the second focus detecting pixels 202 of pixels of the imaging element are aggregated to thereby generate a second focus detection signal. Upon focus detection, the processing for calculating the image shift amount from the first focus detection signal and the second focus detection signal is performed. When the output signal of the first focus detecting pixel 201 and the output signal of the second focus detecting pixel 202 are summed for each pixel of the imaging element, an imaging signal having a resolution corresponding to the number of effective pixels N is generated. In this manner, captured image data can be acquired.

Next, a description will be given of the relationship between the defocus amount between the first focus detection signal and the second focus detection signal acquired by the imaging element 107 and the image shift amount therebetween. FIG. 5B is a schematic view illustrating the relationship between the defocus amount between the first focus detection signal and the second focus detection signal and the image shift amount between the first focus detection signal and the second focus detection signal. The imaging element (not shown) is disposed on an imaging plane 800, and as in FIGS. 4 and 5A, the exit pupil of the focusing optical system is divided into the first partial pupil area 501 and the second partial pupil area 502.

In a defocus amount d, a distance from the imaging position of an object image to the imaging plane 800 is denoted by a magnitude $|d|$. The defocus amount d is defined such that a front focus state in which the imaging position of the object image is on the object side of the imaging plane 800 is negative ($d<0$), and a rear focus state in which the imaging position of the object image is on the opposite side of the imaging plane 800 is positive ($d>0$). A focus state in which the imaging position of the object image is on the imaging plane (in-focus position) is $d=0$. In FIG. 5B, the position of an object 801 shows a position corresponding to the in-focus state ($d=0$), and the position of an object 802 shows a position corresponding to the front focus state ($d<0$). Hereinafter, the front focus state ($d<0$) and the rear focus state ($d>0$) are collectively referred to as a defocus state ($|d|>0$).

In the front focus state ($d<0$), light passed through the first partial pupil area 501 (or the second partial pupil area 502) among light from the object 802 is temporarily converged, and then spreads with the width Γ1 (or Γ2) about a position G1 (or G2) of the center of gravity of the light. In this case, a blurred image is formed on the imaging plane 800. The blurred image is light-received by the first focus detecting pixel 201 (or the second focus detecting pixel 202) constituting each pixel arranged on the imaging element to thereby generate a first focus detection signal (or second focus detection signal). Thus, the first focus detection signal (or second focus detection signal) is detected as an object image (blurred image) having the width Γ1 (or Γ2) at the position G1 (or G2) of the center of gravity on the imaging plane 800. The width Γ1 (or Γ2) of the object image increases substantially in proportion to an increase in the magnitude $|d|$ of the defocus amount d. Likewise, if the image shift amount of the object image between the first focus detection signal and the second focus detection signal is denoted by "p", the magnitude $|p|$ thereof increases with an increase in the magnitude $|d|$ of the defocus amount d. For example, the image shift amount p is defined as the difference "G1−G2" between the positions G1 and G2 of the center of gravity of the light, and the magnitude $|p|$ thereof increases substantially in proportion to an increase in $|d|$. In the rear focus state ($d>0$), although the image shift direction of the object image between the first focus detection signal and the second focus detection signal is opposite to that in the front focus state, the magnitude $|p|$ similarly increases.

As described above, the magnitude of the image shift amount between the first focus detection signal and the second focus detection signal increases with an increase in the magnitude of the defocus amount between the first focus detection signal and the second focus detection signal or the magnitude of the defocus amount of an imaging signal obtained by the summation of the first focus detection signal and the second focus detection signal.

In the present embodiment, first focus detection of the phase difference type and second focus detection of the type (hereinafter referred to as "refocus type") based on a refocus principle are performed using the relationship between the defocus amount d and the image shift amount p between the first focus detection signal and the second focus detection signal. Basically, first focus detection is used to perform focus adjustment in the range from the first state (large-defocus state with a large-defocus amount) to the second state (small-defocus state with a small-defocus amount). Furthermore, second focus detection is used to perform focus adjustment in the range from the small-defocus state to a third state (state near the best in-focus position). A sequence of focus detection under the condition (condition including saturated pixels or low brightness condition) where the second focus detection exhibits lower in-focus accuracy than that of the first focus detection will be described below.

Firstly, a description will be given of first focus detection of an imaging plane phase-difference type. In the first focus detection, the following processing is executed.
(1) Computation processing for calculating a correlation amount (first evaluation value) representing a degree of match between the first focus detection signal and the second focus detection signal by relatively shifting the signals.
(2) Processing for calculating the image shift amount from a shift amount at which a correlation amount (a degree of match between signals) increases.
(3) Processing for converting the image shift amount into a first detection defocus amount using the relationship in which the magnitude of the image shift amount between the first focus detection signal and the second focus detection signal increases with an increase in the magnitude of the defocus amount of the imaging signal. Hereinafter, the first detection defocus amount is referred to as the first detection amount and is denoted by Def1.

Figure 6:
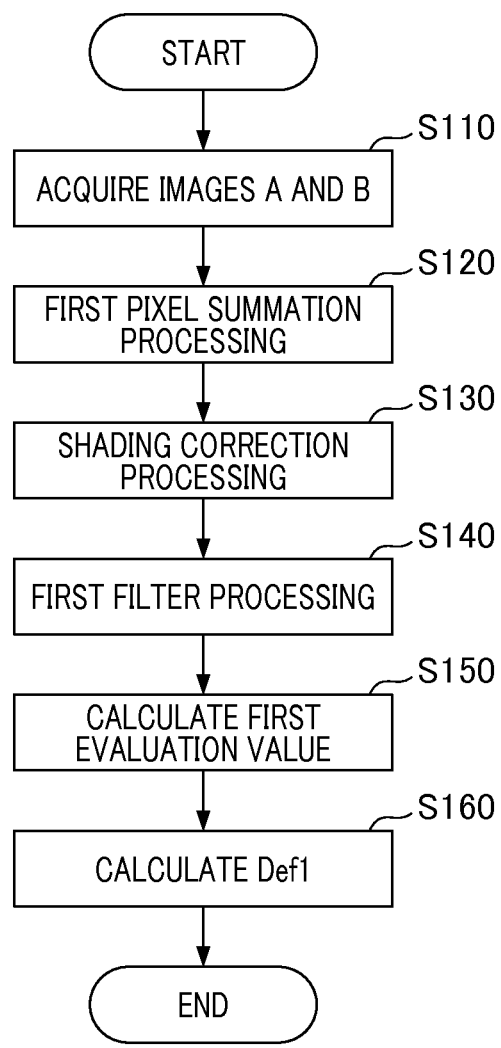
FIG. 6 is a flowchart illustrating first focus detection processing.

FIG. 6 is a flowchart schematically illustrating the flow of first focus detection processing. The processing is performed by a focus detection signal generating unit which is realized by controlling the imaging element 107 and the image processing circuit 125 in accordance with the program executed by the CPU 121.

In step S110, the processing for setting a focus detection area is performed for focus adjustment within an effective pixel area of the imaging element 107. In the focus detection area, the focus detection signal generating unit generates a first focus detection signal from the light-receiving signal (image-A signal) of the first focus detecting pixel, and generates a second focus detection signal from the light-receiving signal (image-B signal) of the second focus detecting pixel. In step S120, summation processing for summing three pixels in the column direction for each of the first focus detection signal and the second focus detection signal is performed in order to suppress the signal data amount. Furthermore, the Bayer (RGB) summation processing is performed for converting an RGB signal into a brightness signal (signal Y). These two summation processings are combinedly referred to as "first pixel summation processing". In step S130, shading correction processing (optical correction processing) is performed for each of the first focus detection signal and the second focus detection signal.

A description will be given of shading caused by a pupil shift between the first focus detection signal and the second focus detection signal with reference to FIGS. 7A to 7C. Each of FIGS. 7A to 7C illustrates the relationship between the first partial pupil area 501 of the first focus detecting pixel 201 and the second partial pupil area 502 of the second focus detecting pixel 202 at the peripheral image height of the imaging element and an exit pupil 400 of the focusing optical system.

FIG. 7A shows the case where the exit pupil distance D1 of the focusing optical system is the same as the set pupil distance Ds of the imaging element. In this case, the exit pupil 400 of the focusing optical system is substantially evenly pupil-divided by the first partial pupil area 501 and the second partial pupil area 502. In contrast, FIG. 7B shows the case where the exit pupil distance D1 of the focusing optical system is shorter than the set pupil distance Ds of the imaging element. In this case, a pupil shift occurs between the exit pupil of the focusing optical system and the entrance pupil of the imaging element at the peripheral image height of the imaging element, so that the exit pupil 400 of the focusing optical system is unevenly pupil-divided. FIG. 7C shows the case where the exit pupil distance D1 of the focusing optical system is longer than the set pupil distance Ds of the imaging element. In this case, a pupil shift occurs between the exit pupil of the focusing optical system and the entrance pupil of the imaging element at the peripheral image height of the imaging element, so that the exit pupil 400 of the focusing optical system is unevenly pupil-divided. Uneven pupil division occurs at the peripheral image height, so that the intensity of the first focus detection signal and the second focus detection signal becomes uneven. Consequently, shading occurs such that an intensity of one of the first focus detection signal and the second focus detection signal becomes relatively larger than that of the other one.

In step S130 in FIG. 6, a shading correction coefficient is determined based on the image height of the focus detection area, the F-number of the imaging lens (focusing optical system), and the exit pupil distance. In other words, a first shading correction coefficient and a second shading correction coefficient are generated for the first focus detection signal and the second focus detection signal, respectively. The shading correction processing is executed by multiplying the first shading correction coefficient by the first focus detection signal and by multiplying the second shading correction coefficient by the second focus detection signal.

In the first focus detection of the phase difference type, first detection amount detection processing is performed based on a correlation (a degree of match between signals) of the first focus detection signal with the second focus detection signal. If shading occurs due to a pupil shift, a correlation (a degree of match between signals) of the first focus detection signal with the second focus detection signal may decrease. In the first focus detection of the phase difference type, a correlation (a degree of match between signals) of the first focus detection signal with the second focus detection signal can be improved by the shading correction processing, resulting in improved focus detection performance.

Figure 8:
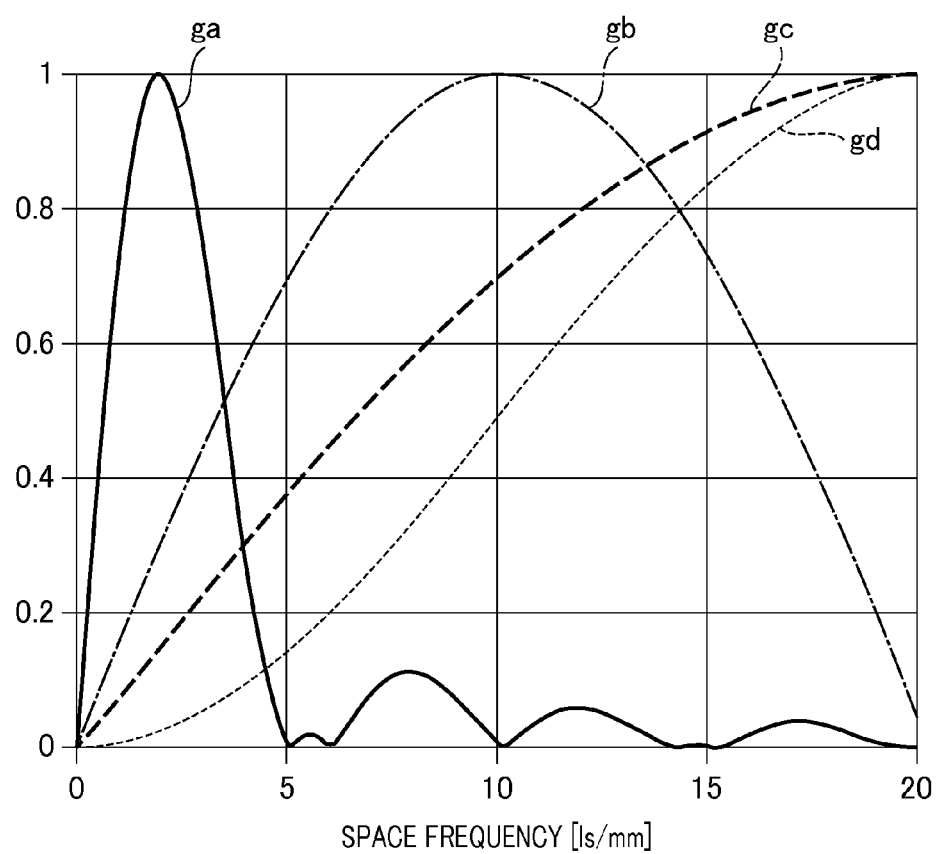
FIG. 8 is a graph illustrating a filter frequency band.

In step S140 in FIG. 6, the first filter processing is performed for the first focus detection signal and the second focus detection signal. The passband of the first filter processing is illustrated in the graph ga shown by the solid line in FIG. 8. A space frequency (line·space/mm) is plotted on the horizontal axis, and a gain is plotted on the vertical axis with its maximum value set as 1. In the present embodiment, since focus detection in a large-defocus state is performed by the first focus detection of the phase difference type, the filter is configured such that the passband of the first filter processing includes a low frequency band. Upon focus adjustment from a large-defocus state to a small-defocus state, the passband of the first filter processing upon first focus detection may be adjusted to a higher frequency band as shown in the graph gb shown by the chain-dotted line in FIG. 8 in accordance with the defocus state. Such band filter characteristics are adjusted for a condition including a saturated signal to be described below, so that the effect of improving the accuracy of the first detection amount (Def1) by the first focus detection is obtained.

Next, the first shift processing for relatively shifting the first focus detection signal and the second focus detection signal obtained after the first filter processing in the pupil division direction is performed in step S150 in FIG. 6. A correlation amount (first evaluation value) representing a degree of match between the first focus detection signal and the second focus detection signal is calculated by the first shift processing. The kth first focus detection signal obtained after the first filter processing is denoted by A(k) and the kth second focus detection signal obtained after the first filter processing is denoted by B(k). The range of the number k corresponding to the focus detection area is denoted by W. Given that the shift amount by the first shift processing is denoted by $s_1$ and its range (shift range) is denoted by $\Gamma 1$, a correlation amount (first evaluation value) COR is calculated by Formula (1):

[Formula 1]

$$COR(s_1) = \sum_{k \in W} |A(k) - B(k - s_1)|, \qquad (1)$$

$$s_1 \in \Gamma 1$$

As a result of the first shift processing by the shift amount $s_1$, a shift subtraction signal is generated by correspondingly subtracting the "$k-s_1$"th second focus detection signal $B(k-s_1)$ from the kth first focus detection signal A(k). An absolute value of the generated shift subtraction signal is calculated, and a summation from the number 1 to the number k in the range W corresponding to the focus detection area, so that a correlation amount (first evaluation value) COR ($s_1$) can be calculated. If required, a correlation amount (first evaluation value) calculated for each row may be summed over a plurality of rows for each shift amount.

In step S160, the processing for calculating a real value shift amount by which the correlation amount becomes a minimum value is executed by sub-pixel computation based on the correlation amount (first evaluation value) calculated in step S150 to thereby calculate an image shift amount p1. The image shift amount p1 is multiplied by the first conversion coefficient K1 corresponding to the image height of the focus detection area, the F-number of the imaging lens (focusing optical system), and the exit pupil distance to thereby calculate the first detection amount (Def1).

As described above, in the first focus detection of the phase difference type, a correlation amount is calculated by performing the first filter processing and the first shift processing for the first focus detection signal and the second focus detection signal to thereby detect a first detection amount from the correlation amount.

In the imaging element, light received by the focus detecting pixels (first focus detecting pixel and second focus detecting pixel) is different from light received by the imaging pixel, so that the focus detecting pixel and the imaging signal may be differently affected by the aberrations (spherical aberration, astigmatism, coma aberration, and the like) of the focusing optical system. The difference increases with a decrease (bright) in the F-number of the focusing optical system. Thus, when the F-number of the focusing optical system is small (bright), a difference may occur between the detected in-focus position calculated by the first focus detection of the phase difference type, i.e., a position where the first detection amount becomes 0 and the best in-focus position of the imaging signal. The best in-focus position of the imaging signal corresponds to the peak position of the MTF (Modulation Transfer Function) for the imaging signal. Thus, in particular, if the F-number of the focusing optical system is equal to or less than a predetermined value, the focus detection accuracy of the first focus detection of the phase difference type may be deteriorated.

Figure 9A:
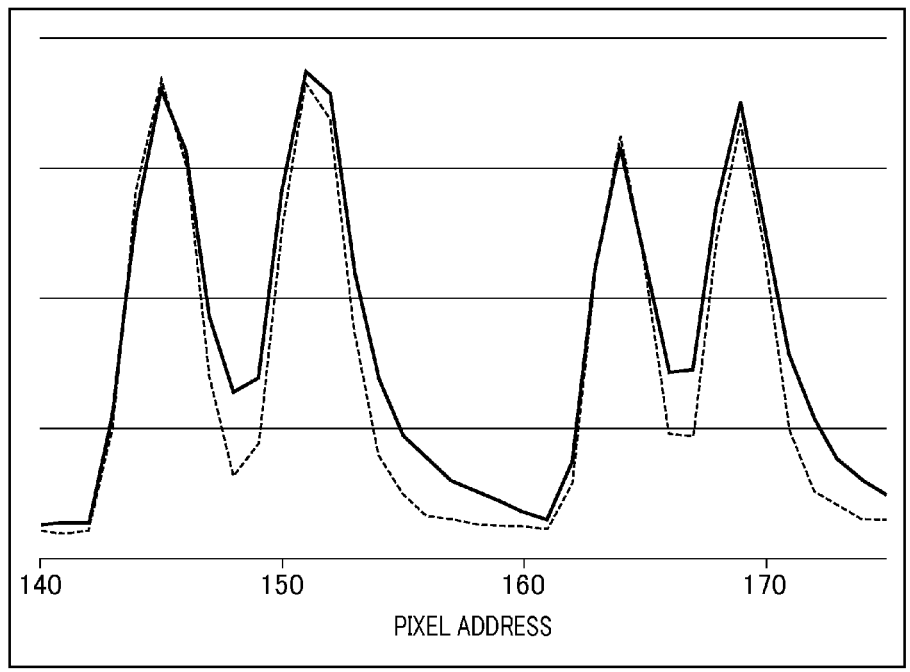
FIG. 9A is a graph illustrating the first and second focus detection signals.
Figure 9B:
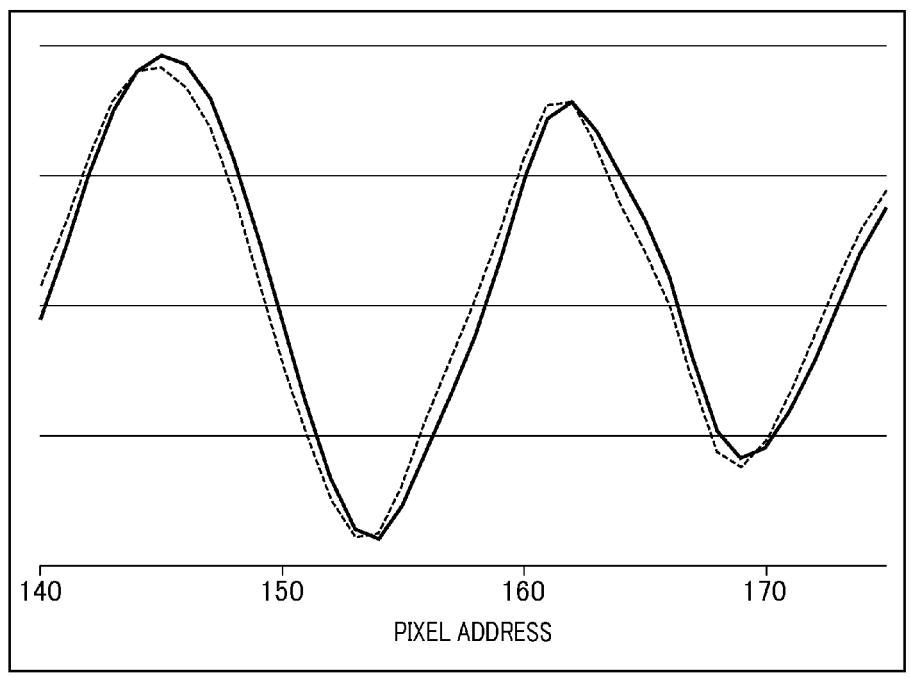
FIG. 9B is a graph illustrating the first and second focus detection signals obtained after optical correction processing and first filter processing.

FIG. 9A illustrates a first focus detection signal (broken line) and a second focus detection signal (solid line) at the best in-focus position of the imaging signal at the peripheral image height of the imaging element. A pixel address corresponding to a pixel position is plotted on the horizontal axis and a signal level is plotted on the vertical axis. FIG. 9A shows an example in which the shape of the first focus detection signal is different from that of the second focus detection signal due to the respective aberrations of the focusing optical system. FIG. 9B illustrates a first focus detection signal (broken line) and a second focus detection signal (solid line) obtained after the shading correction processing and the first filter processing. This example shows a case where the image shift amount p1 between the first focus detection signal and the second focus detection signal is not zero at the best in-focus position of the imaging signal. In this case, a difference occurs between the detected in-focus position calculated by the first focus detection of the phase difference type and the best in-focus position of the imaging signal.

Figure 10:
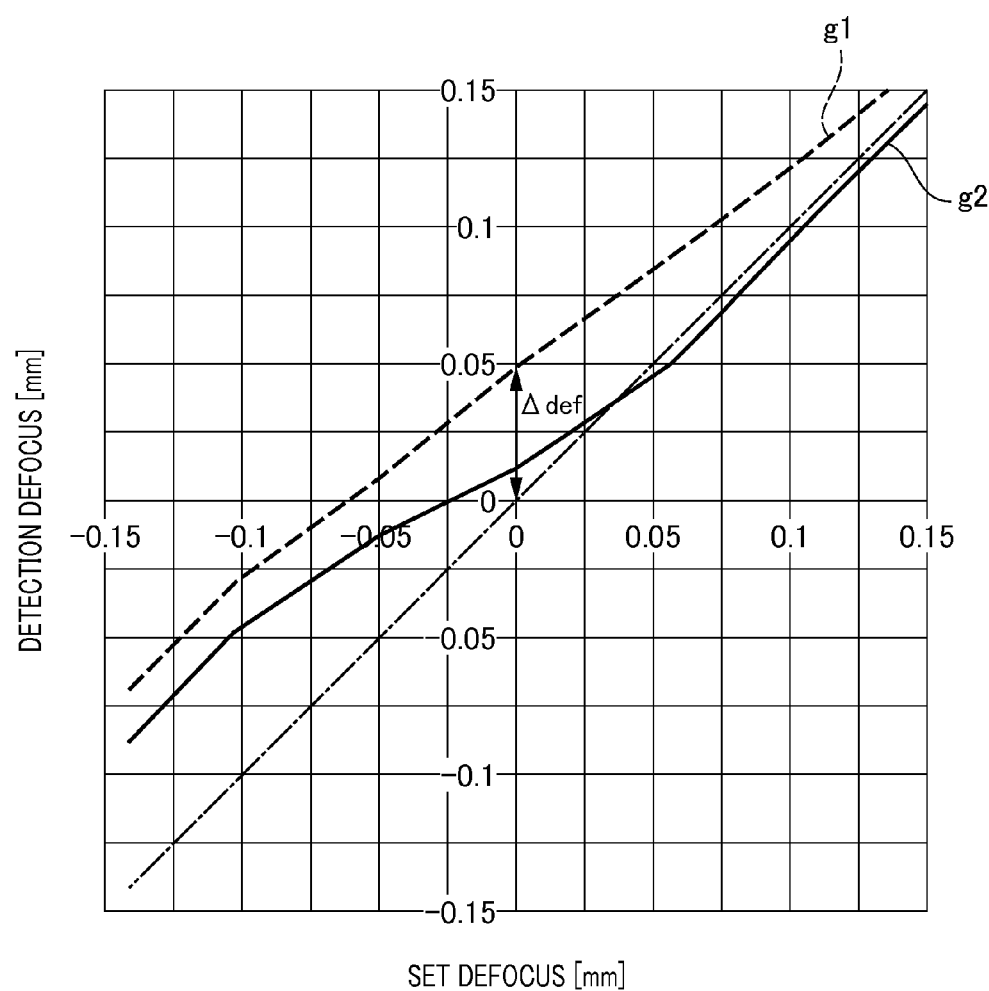
FIG. 10 is a graph illustrating an exemplary calculation of first and second detection defocus amounts.

FIG. 10 illustrates a first detection amount (see the graph g1 shown by a broken line) by the first focus detection of the phase difference type. A set defocus amount (unit: mm) is plotted on the horizontal axis and a detection defocus amount (unit: mm) is plotted on the vertical axis. A chain-dotted line shows a graph obtained when the set defocus amount is directly proportional to the detection defocus amount in the proportion of 1:1. The first focus detection signal and the second focus detection signal shown in FIG. 9A are the first focus detection signal and the second focus detection signal when the set defocus amount is 0 in FIG. 10. In the example shown in FIG. 10, the first detection amount by the first focus detection has an offset of about 50 μm (micrometer) on the rear focus side at the best in-focus position where the set defocus amount is 0 (see Δdef). In other words, it can be seen that the difference of about 50 μm occurs between the best in-focus position and the detected in-focus position calculated by the first focus detection. Highly-accurate focus detection can be achieved by suppressing the difference between the detected in-focus position calculated by the focus detection signal and the best in-focus position of the imaging signal. For that purpose, the second focus detection of the refocus type which can achieve highly-accurate focus detection in the vicinity of the best in-focus position of the focusing optical system is performed in addition to the first focus detection of the phase difference type.

Hereinafter, a description will be given of the second focus detection of the refocus type according to the present embodiment. In the second focus detection of the refocus type, the first focus detection signal and the second focus detection signal are summed by relatively shifting the signals to thereby generate a shift summation signal (refocus signal). The MTF peak position of the imaging signal is calculated by using a contrast evaluation value calculated from the generated refocus signal to thereby calculate a second detection defocus amount. Hereinafter, the second detection defocus amount is referred to as the second detection amount and is denoted by Def2.

Figure 11:
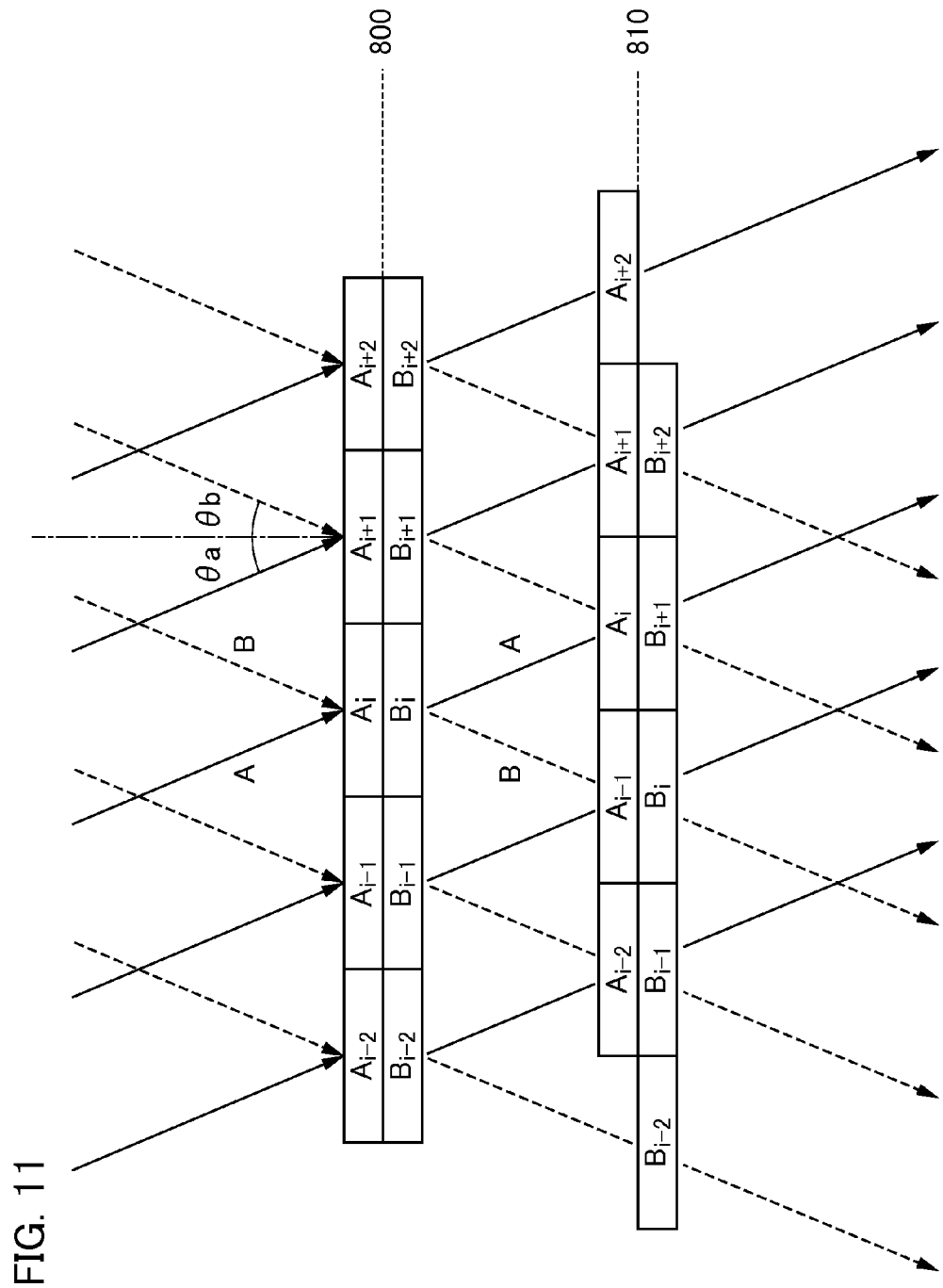
FIG. 11 is a schematic explanatory view illustrating refocus processing.

FIG. 11 is an explanatory view schematically illustrating refocus processing in the one-dimensional direction (column direction or horizontal direction) using the first focus detection signal and the second focus detection signal. The imaging plane 800 shown in FIG. 11 corresponds to the imaging plane 800 shown in FIGS. 5A and 5B. FIG. 11 schematically shows the ith pixel in the column direction of the imaging element disposed on the imaging plane 800, where the symbol i is an integer variable. A first focus detection signal obtained by the ith pixel is denoted by $A_i$, and a second focus detection signal obtained by the ith pixel is denoted by $B_i$. The first focus detection signal $A_i$ is a light-receiving signal of light incident on the ith pixel at the chief ray angle θa (corresponding to the first partial pupil area 501 shown in FIGS. 5A and 5B). The second focus detection signal $B_i$ is a light-receiving signal of light incident on the ith pixel at the chief ray angle θb (corresponding to the second partial pupil area 502 shown in FIGS. 5A and 5B).

Each of the first focus detection signal $A_i$ and the second focus detection signal $B_i$ has not only light intensity distribution information but also incident angle information. The refocus signal can be generated on a virtual imaging surface 810 in accordance with the following translational movement and summation processing.

Processing for translationally moving the first focus detection signal $A_i$ to the virtual imaging surface 810 along the direction of the angle θa and for translationally moving the second focus detection signal $B_i$ to the virtual imaging surface 810 along the direction of the angle θb.

Processing for summing the first focus detection signal and the second focus detection signal subjected to translational movement.

Translational movement of the first focus detection signal $A_i$ to the virtual imaging surface 810 along the direction of the angle θa corresponds to +0.5 pixel shift in the column direction. Translational movement of the second focus detection signal $B_i$ to the virtual imaging surface 810 along the direction of the angle θb corresponds to −0.5 pixel shift in the column direction. Thus, the first focus detection signal $A_i$ and the second focus detection signal $B_i$ are relatively shifted by +1 pixel, and then $A_i$ and $B_{i+1}$ are correspondingly summed, so that the refocus signal on the virtual imaging surface 810 can be generated. Likewise, the first focus detection signal $A_i$ and the second focus detection signal $B_i$ are summed by the integer pixel shift, so that a shift summation signal (refocus signal) on each virtual imaging surface corresponding to the integer shift amount can be generated. A contrast evaluation value is calculated from the generated shift summation signal (refocus signal). The MTF peak position of the imaging signal is calculated from the calculated contrast evaluation value to thereby perform the second focus detection of the refocus type.

A description will be given of the flow of second focus detection processing with reference to the flowchart shown in FIG. 12. The processing is performed by a focus detection signal generating unit which is realized by controlling the imaging element 107 and the image processing circuit 125 in accordance with the program executed by the CPU 121.

In step S210, the processing for setting a focus detection area is performed for focus adjustment within an effective pixel area of the imaging element 107. In the focus detection area, the focus detection signal generating unit generates a first focus detection signal from the light-receiving signal (image-A signal) of the first focus detecting pixel, and generates a second focus detection signal from the light-receiving signal (image-B signal) of the second focus detecting pixel. In step S220, summation processing for summing three pixels in the column direction for each of the first focus detection signal and the second focus detection signal is performed in order to suppress the signal data amount. Furthermore, the Bayer (RGB) summation processing is performed for converting an RGB signal into a brightness signal Y. These two summation processings are combinedly referred to as "second pixel summation processing". Note that one of either 3-pixel summation processing or Bayer (RGB) summation processing or both summation processings may be omitted.

In step S230, the second filter processing is performed for the first focus detection signal and the second focus detection signal. The passband of the second filter processing is illustrated in the graph gc shown by the broken line and the graph gd shown by the dotted line in FIG. 8. In the present embodiment, focus detection is performed from the small-defocus state to the vicinity of the best in-focus position by the second focus detection of the refocus type. Thus, the filter characteristics are set such that the passband of the second filter processing includes a higher frequency band than the passband of the first filter processing. If required, a Laplacian-type (second order derivative type) [1, −2, 1] filter may also be used for edge extraction of an object imaging signal by the second filter processing. In this case, as shown by the graph gd shown by the dotted line in FIG. 8, the passband of the second filter processing can be set to a higher frequency band. The second focus detection is performed by extracting the high frequency component of the object image, resulting in an improvement in focus detection accuracy.

Figure 12:
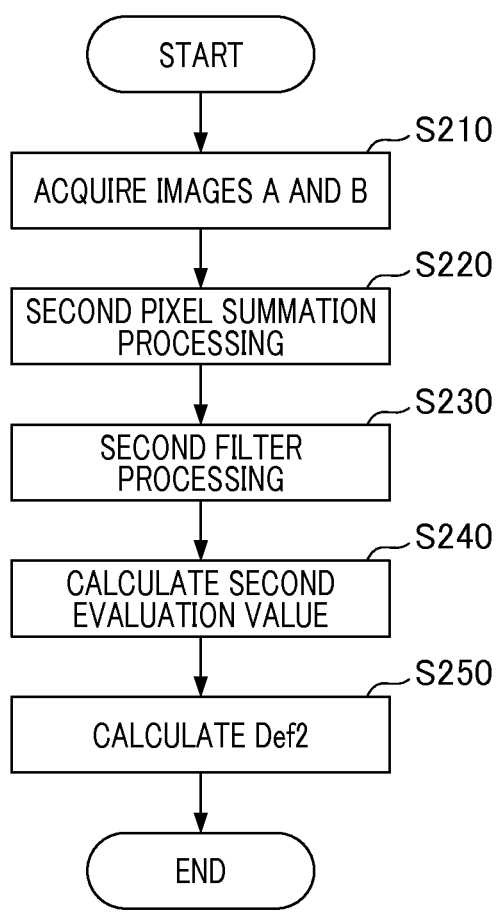
FIG. 12 is a flowchart illustrating second focus detection processing.

In step S240 in FIG. 12, the second shift processing for relatively shifting the first focus detection signal and the second focus detection signal obtained after the first filter processing in the pupil division direction is performed and the resulting signals are summed to thereby generate a shift summation signal (refocus signal). In step S240, the processing for calculating a contrast evaluation value (second evaluation value) from the generated shift summation signal is further performed. The kth first focus detection signal obtained after the second filter processing is denoted by A(k) and the kth second focus detection signal obtained after the second filter processing is denoted by B(k). The range of the number k corresponding to the focus detection area is denoted by W. Given that the shift amount by the second shift processing is denoted by $s_2$ and its range (shift range) is denoted by $\Gamma 2$, a contrast evaluation value (second evaluation value) RFCON is calculated by Formula (2):

[Formula 2]

$$RFCON(s_2) = \max_{k \in W} |A(k) + B(k - s_2)|, \quad (2)$$

$$s_2 \in \Gamma 2$$

As a result of the second shift processing by the shift amount $s_2$, a shift summation signal is generated by correspondingly summing the kth first focus detection signal A(k) and the "k−$s_2$"th second focus detection signal B(k−$s_2$). An absolute value of the generated shift summation signal is calculated, and the maximum value is taken in the range W corresponding to the focus detection area, so that RFCON ($s_2$) is calculated as a contrast evaluation value (second evaluation value). If required, a contrast evaluation value (second evaluation value) calculated for each row may be summed over a plurality of rows for each shift amount.

In step S250, the processing for calculating a real value shift amount by which the contrast evaluation value becomes a maximum value is executed by sub-pixel computation based on the contrast evaluation value (second evaluation value) calculated in step S240 to thereby calculate a peak shift amount p2. The peak shift amount p2 is multiplied by the second conversion coefficient K2 corresponding to the image height of the focus detection area, the F-number of the imaging lens (focusing optical system), and the exit pupil distance to thereby calculate the second detection amount (Def2). If required, the value of the second conversion coefficient K2 may be the same as that of the first conversion coefficient K1.

As described above, in the second focus detection of the refocus type, the second filter processing and the second shift processing are performed for the first focus detection signal and the second focus detection signal, and then the resulting signals are summed to generate a shift summation signal. A contrast evaluation value is calculated from the generated shift summation signal, and then the second detection amount (Def2) is calculated from the contrast evaluation value.

Figure 5A:
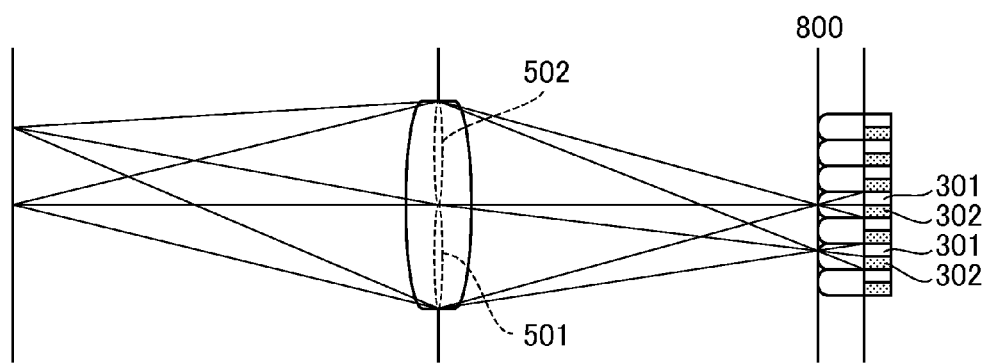
FIG. 5A is a schematic explanatory view illustrating an imaging element and pupil division.
Figure 5B:
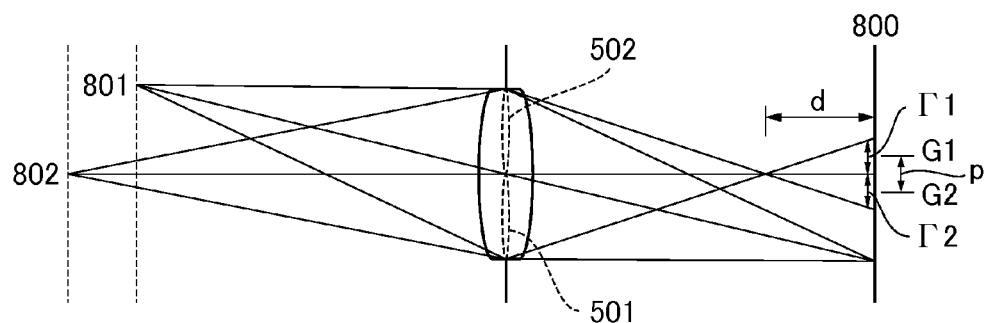
FIG. 5B is a schematic view illustrating the relationship between the defocus amount between a first focus detection signal and a second focus detection signal and the image shift amount therebetween.

In the imaging element 107 of the present embodiment, the result obtained by summing light received by the first focus detecting pixel and light received by the second focus detecting pixel becomes light received by the imaging pixel as shown in FIGS. 4, 5A, and 5B. In contrast to the first focus detection of the phase difference type, in the second focus detection of the refocus type, focus detection is performed by a shift summation signal (refocus signal) of the first focus detection signal and the second focus detection signal. Thus, light corresponding to the shift summation signal used in the second focus detection substantially matches light corresponding to the imaging signal. The shift summation signal and the imaging signal may be substantially identically affected by the aberrations (spherical aberration, astigmatism, coma aberration, and the like) of the focusing optical system. Thus, the detected in-focus position (position where the second detection amount becomes 0) calculated by the second focus detection of the refocus type substantially matches the best in-focus position of the imaging signal (the MTF peak position of the imaging signal). In other words, the second focus detection of the refocus type is relatively highly accurate as compared with the first focus detection of the phase difference type.

Figure 13A:
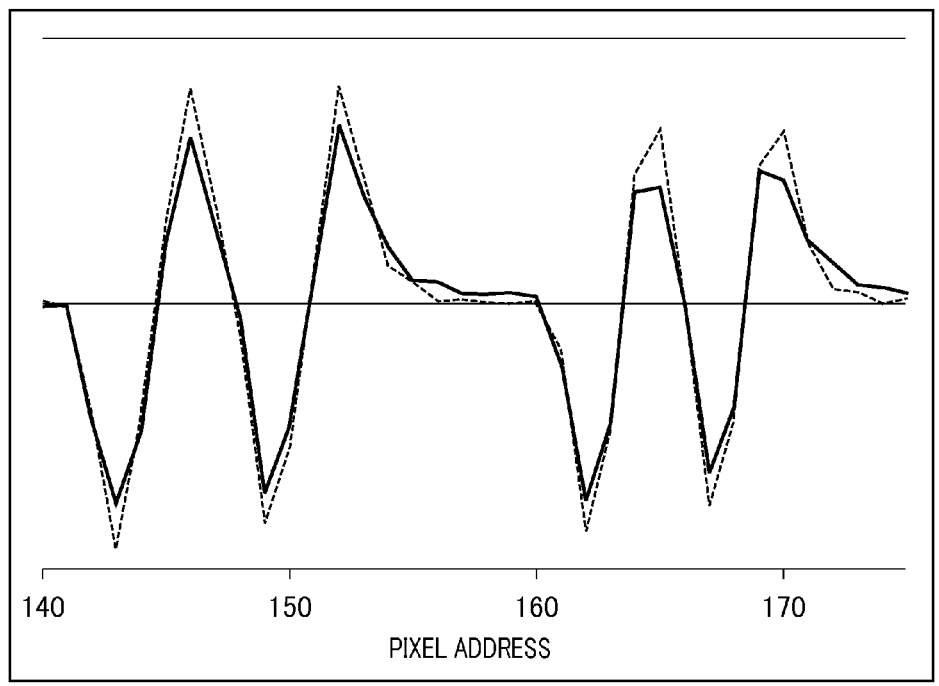
FIG. 13A is a graph illustrating the first and second focus detection signals obtained after second filter processing.
Figure 13B:
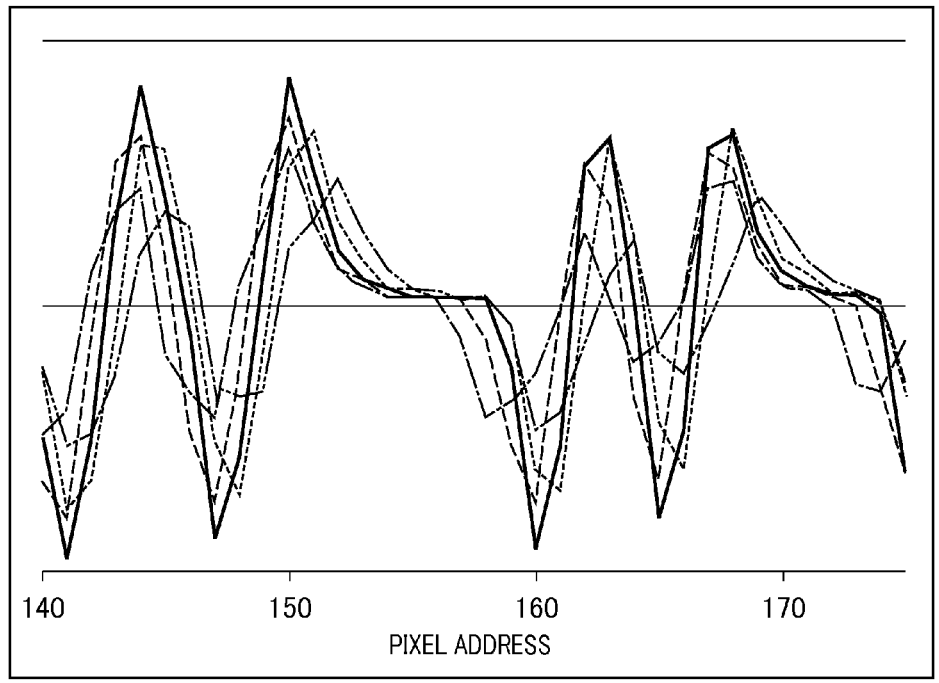
FIG. 13B is a graph illustrating a signal obtained after shift summation of the first and second focus detection signals obtained after second filter processing.
Figure 14:
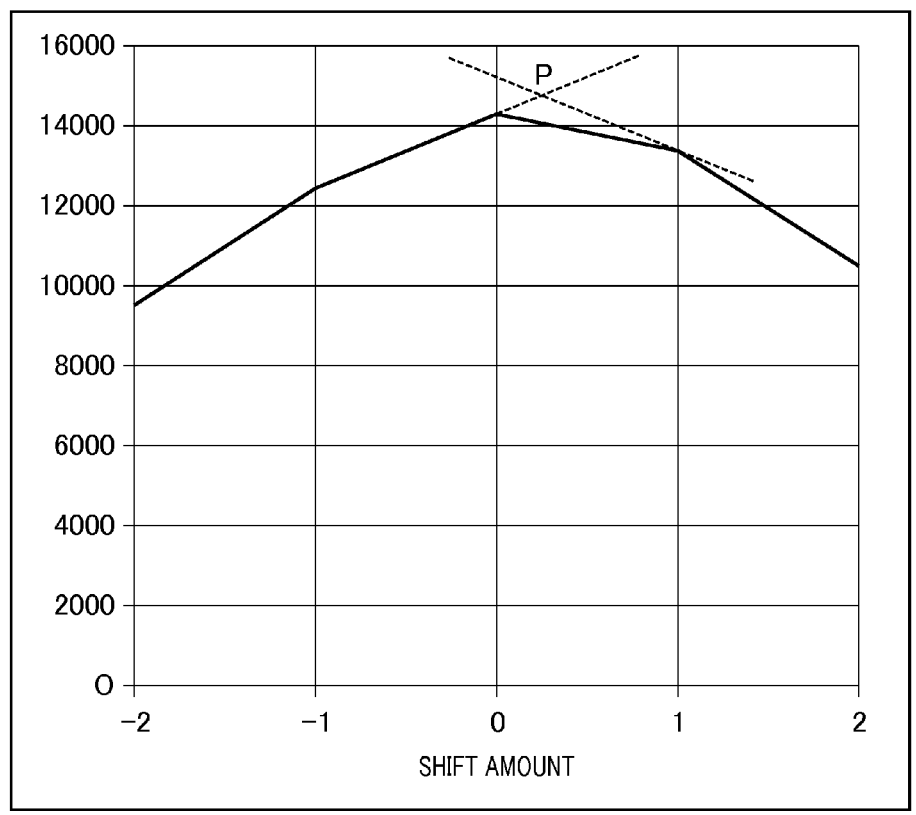
FIG. 14 is a graph illustrating a second evaluation value.

The first focus detection signal (broken line) and the second focus detection signal (solid line) subjected to the second filter processing are shown in FIG. 13A by taking an example of the first focus detection signal (broken line) and the second focus detection signal (solid line) at the best in-focus position of the imaging signal at the peripheral image height of the imaging element shown in FIG. 9A. A pixel address is plotted on the horizontal axis and a signal level is plotted on the vertical axis. A shift summation signal (refocus signal) obtained by summing the first focus detection signal (broken line) and the second focus detection signal (solid line) subjected to the second filter processing by relatively shifting the signals by the shift amount of −2, −1, 0, 1, and 2 is shown in FIG. 13B. It can be seen that the peak value of the shift summation signal varies with a change in shift amount. A contrast evaluation value (second evaluation value) calculated from the shift summation signals is shown in FIG. 14. A shift amount is plotted on the horizontal axis and a contrast evaluation value is plotted on the vertical axis.

FIG. 10 illustrates the second detection amount (see the graph g2 shown by a solid line) by the second focus detection of the refocus type according to the present embodiment. The first focus detection signal and the second focus detection signal shown in FIG. 9A are the first focus detection signal and the second focus detection signal obtained when the set defocus amount shown in FIG. 10 is 0 [mm]. Since the second detection amount by the second focus detection is suppressed to less than the first detection amount by the first focus detection at the best in-focus position where the set defocus amount is zero, it can be seen that focus detection can be performed with high accuracy. In other words, the second focus detection of the refocus type achieves high detection accuracy as compared with the first focus detection of the phase difference type in the vicinity of the best in-focus position where the set defocus amount of the focusing optical system is zero.

Figure 15:
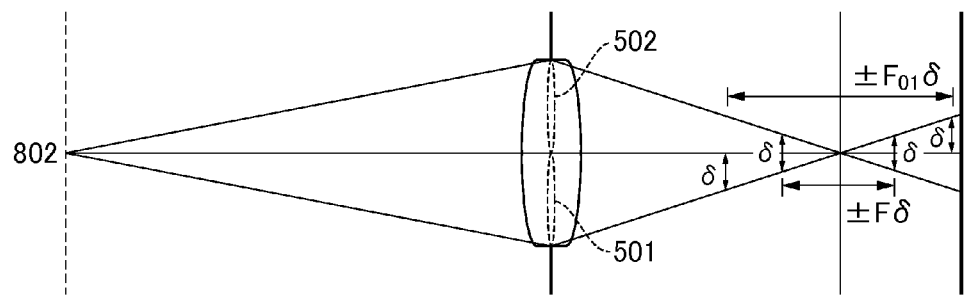
FIG. 15 is a schematic explanatory view illustrating a refocusable range.

On the other hand, since the refocusable range is limited, the range of the defocus amount which can be focus-detected by the second focus detection of the refocus type with high accuracy is limited. A description will be given of the refocusable range in the present embodiment with reference to FIG. 15. Given that the allowable confusion circle diameter is denoted by δ and the F-number of the focusing optical system is denoted by F, a depth of field at the F-number F is ±F×δ. In contrast, the effective F-number $F_{01}$ (or $F_{02}$) in the horizontal direction of the partial pupil area 501 (or 502) which is narrowed by being divided into $N_H \times N_V$ (e.g., 2×1) becomes darken by $F_{01} = N_H \times F$ (or $F_{02} = N_H \times F$). An effective depth of field for each first focus detection signal (or second focus detection signal) becomes $N_H$ times deep by $\pm N_H \times F \times \delta$, and the in-focus range is spread over $N_H$ times. An object image which is in-focus for each first focus detection signal (or second focus detection signal) is acquired within the range of the effective depth of field "$\pm N_H \times F \times \delta$". Thus, the in-focus position can be re-adjusted (refocus) after shooting by the refocus processing for translationally moving the first focus detection signal (or second focus detection signal) along the chief ray angle θa (or θb) shown in FIG. 11.

The defocus amount d from the imaging plane, which can be re-adjusted to the in-focus position after shooting, is limited. The refocusable range of the defocus amount d is generally in the range of Formula (3):

[Formula 3]

$$|d| \leq N_H \times F \times \delta \quad (3)$$

The allowable confusion circle diameter δ is defined by $\delta = 2 \cdot \Delta X$ (reciprocal of the Nyquist frequency $1/(2 \cdot \Delta X)$ of the pixel cycle $\Delta X$) or the like. If required, the allowable confusion circle diameter may be used as $\delta = 2 \cdot \Delta X_{AF}$ from the reciprocal of the Nyquist frequency $1/(2 \cdot \Delta X_{AF})$ of the cycle $\Delta X_{AF}$ ($= M \cdot \Delta X$: in the case of M pixel summation) of the first focus detection signal (or second focus detection signal) obtained after the second pixel summation processing.

The range of the defocus amount which can be detected with high accuracy by the second focus detection of the refocus type is generally limited in the range of Formula (3). The defocus range which can be detected by the second focus detection with high accuracy is equal to or less than the defocus range which can be detected by the first focus detection of the phase difference type. As shown in FIG. 5B, the relative shift amount between the first focus detection signal and the second focus detection signal in the horizontal direction is substantially proportional to the defocus amount therebetween.

The present embodiment is based on the first focus detection for performing a focus adjustment from the large-defocus state to the small-defocus state of the focusing optical system and the second focus detection for performing a focus adjustment from the small-defocus state of the focusing optical system to the vicinity of the best in-focus position. The passband of the second filter processing in the second focus detection includes a higher frequency band than the passband of the first filter processing in the first focus detection. The number of pixels summed by the second pixel summation processing in the second focus detection is equal to or less than the number of pixels summed by the first pixel summation processing in the first focus detection.

As described above, if the F-number of the focusing optical system is equal to or less than a predetermined F-number, the focus detection accuracy of the first focus detection of the phase difference type may deteriorate. Thus, if required, if the F-number of the focusing optical system is equal to or less than a predetermined F-number, the first focus detection of the phase difference type and the second focus detection of the refocus type are used. In other words, highly-accurate focus detection can be realized by using the second detection amount.

Next, a description will be given of focus detection processing when a saturated pixel is included. If the image area (AF area) targeted for focus detection includes a saturated pixel, the accuracy of the second detection amount in the second focus detection may become lower than the accuracy of the first detection amount by the first focus detection. This occurs because a shift summation signal is saturated when the output of a saturated pixel is included in a portion of signals to be subject to shift summation upon second focus detection, which results in a state of no gradation (no contrast) of brightness. FIG. 16A is a view comparatively illustrating the first focus detection signal (solid line) and the second focus detection signal (broken line) in the state (I) including a saturated pixel signal and the state (II) without including a saturated pixel signal. A pixel address corresponding to a pixel position is plotted on the horizontal axis and a signal level is plotted on the vertical axis. Both signals have waveforms which mutually match by the 2-bit shift amount of movement.

FIG. 16B is a diagram illustrating a shift summation signal obtained by summation after shift processing for the first focus detection signal and the second focus detection signal shown in FIG. 16A. The state (I) including a saturated pixel signal is shown on the left side of FIG. 16B and the state (II) without including a saturated pixel signal is shown on the right side of FIG. 16B. FIG. 16C is a plot diagram of a maximum value (so-called "contrast evaluation value") of the shift summation signal shown in FIG. 16B subjected to differentiation processing under the shift conditions. A bit shift amount is plotted on the horizontal axis and a contrast evaluation value is plotted on the vertical axis. The state (I) including a saturated pixel signal is shown on the left side of FIG. 16C and the state (II) without including a saturated pixel signal is shown on the right side of FIG. 16C. In the state (II), there is a peak in the contrast evaluation value in the 2-bit shift state (see "−2" on the horizontal axis of FIG. 16C). However, in the state (I), there is no peak in the 2-bit shift state (see "−2" on the horizontal axis of FIG. 16C) at which there should be a peak. Thus, the best in-focus position cannot be correctly detected. Accordingly, in the present embodiment, the following focus detection processing is performed under a condition including a saturated signal.

FIG. 17 is a flowchart illustrating the flow of focus detection processing according to the present embodiment. The processing is realized by a program executed by the CPU 121.

In the present embodiment, the content of focus detection processing is changed between the case where the number of focus detecting pixels which have detected saturation of the output exceeds a threshold value and the case where the number of focus detecting pixels is equal to or less than a threshold value. For example, if the number of saturation lines (denoted by "SL") is equal to or less than a predetermined number, the focus lens is driven based on the result of the first focus detection of the phase difference type until an absolute value of the defocus amount of the focusing optical system is equal to or less than a predetermined value 1 (first threshold value). In this manner, a focus adjustment operation is performed from the large-defocus state to the small-defocus state of the focusing optical system. Then, the focus lens is driven based on the result of the second focus detection of the refocus type until an absolute value of the defocus amount of the focusing optical system is equal to or less than a predetermined value 2 (second threshold value where "the predetermined value 2<the predetermined value 1"). In this manner, a focus adjustment operation is performed from the small-defocus state to the vicinity of the best in-focus position of the focusing optical system. If the number of saturation lines SL is larger than a predetermined number, the focus lens is driven based on the result of the first focus detection of the phase difference type until an absolute value of the defocus amount of the focusing optical system is equal to or less than the predetermined value 1. In this manner, a focus adjustment operation is performed from the large-defocus state to the small-defocus state of the focusing optical system. Then, third filter processing is performed by changing the passband of the first filter processing in the first focus detection. In the third filter processing, computation processing is executed by using a filter having a high passband equivalent to the passband of the second filter processing in the second focus detection. The first focus detection is performed again by changing the passband, and then the focus lens is driven based on the result of the first focus detection of the phase difference type until an absolute value of the defocus amount of the focusing optical system is equal to or less than a predetermined value 3 (third threshold value where "the predetermined value 3<the predetermined value 1"). In this manner, a focus adjustment operation is executed from the small-defocus state to the further small-defocus state of the focusing optical system.

Upon start of the processing in FIG. 17, the saturation detecting unit 1211 counts the number of saturation lines SL of a captured image in step S010. At this time, the range of the number of saturation lines SL counted by the saturation detecting unit 1211 may be limited within the set AF range. Note that a saturation line indicates a row including a saturated pixel. In step S011, the number of saturation lines SL is compared with a predetermined number (denoted by "SL1"). If the number of saturation lines SL counted in step S010 is greater than the predetermined number of saturation lines SL1 which may adversely affect on the AF result, the processing proceeds to step S100. If the number of saturation lines SL counted in step S010 is equal to or less than the predetermined number of saturation lines SL1, the processing proceeds to step S104.

If the judging condition in step S012 is not met, the processing in steps S100 and S101 is executed as iteration processing. In step S100, the first detection amount (Def1) is detected based on the result of the first focus detection of the phase difference type. In step S012, the magnitude |Def1| of the first detection amount (Def1) is compared with the predetermined value 1. If |Def1| is greater than the predetermined value 1, the processing proceeds to step S101, whereas if |Def1| is equal to or less than the predetermined value 1, the processing shifts to step S013. In step S101, the focus lens is driven in accordance with the first detection amount (Def1), and the processing returns to step S100.

In step S013, filter band change processing is executed. As the third filter processing to be used upon later detection of the first detection amount again, the processing for changing the passband of the first filter processing in the first focus detection to a high passband equivalent to the passband of the second filter processing in the second focus detection is performed. By increasing the passband of the first filter processing in the small-defocus state, a focus adjustment can be made from the small-defocus state to the further small-defocus state of the focusing optical system.

If the judging condition in step S014 is not met, the processing in steps S102 and S103 is executed as iteration processing. In step S102, the first detection amount (Def1) is detected based on the first focus detection of the phase difference type. In step S014, the magnitude |Def1| of the first detection amount (Def1) is compared with the predetermined value 3 (<the predetermined value 1). If |Def1| is greater than the predetermined value 3, the processing proceeds to step S103, whereas if |Def1| is equal to or less than the predetermined value 3, the focus adjustment operation ends. In step S103, the focus lens is driven in accordance with the first detection amount (Def1), and the processing returns to step S102.

If the judging condition in step S015 is not met, the processing in steps S104 and S105 is executed as iteration processing. In step S104, the first detection amount (Def1) is detected based on the first focus detection of the phase difference type. In step S015, the magnitude |Def1| of the first detection amount (Def1) is compared with the predetermined value 1. If |Def1| is greater than the predetermined value 1, the processing proceeds to step S105, whereas if |Def1| is equal to or less than the predetermined value 1, the processing shifts to step S200. In step S105, the focus lens is driven in accordance with the first detection amount (Def1), and the processing returns to step S104.

If the judging condition in step S016 is not met, the processing in steps S200 and S201 is executed as iteration processing. In step S200, the second detection amount (Def2) is detected based on the result of the second focus detection of the refocus type. In step S016, the magnitude |Def2| of the second detection amount (Def2) is compared with the predetermined value 2 (<the predetermined value 1). If |Def2| is greater than the predetermined value 2, the processing proceeds to step S201, whereas if |Def2| is equal to or less than the predetermined value 2, the focus adjustment operation ends. In step S201, the focus lens is driven in accordance with the second detection amount (Def2), and the processing returns to step S200.

By executing the above processing, highly-accurate focus detection can be achieved even under a condition including a saturation line which may cause a deterioration in accuracy of the second detection amount in the second focus detection.

Next, a description will be given of focus detection processing in the case of low brightness. If the object brightness is low, the accuracy of the second detection amount in the second focus detection may deteriorate as compared with the accuracy of the first detection amount by the first focus detection. In the second focus detection, a second evaluation value is calculated by the edge extraction of shift summation signals. If the S/N ratio (signal-to-noise ratio) lowers under a low brightness condition, a peak caused by a shot noise or the like may be erroneously determined to be high contrast. In the present embodiment, a countermeasure is taken by the following processing.

Figure 18:
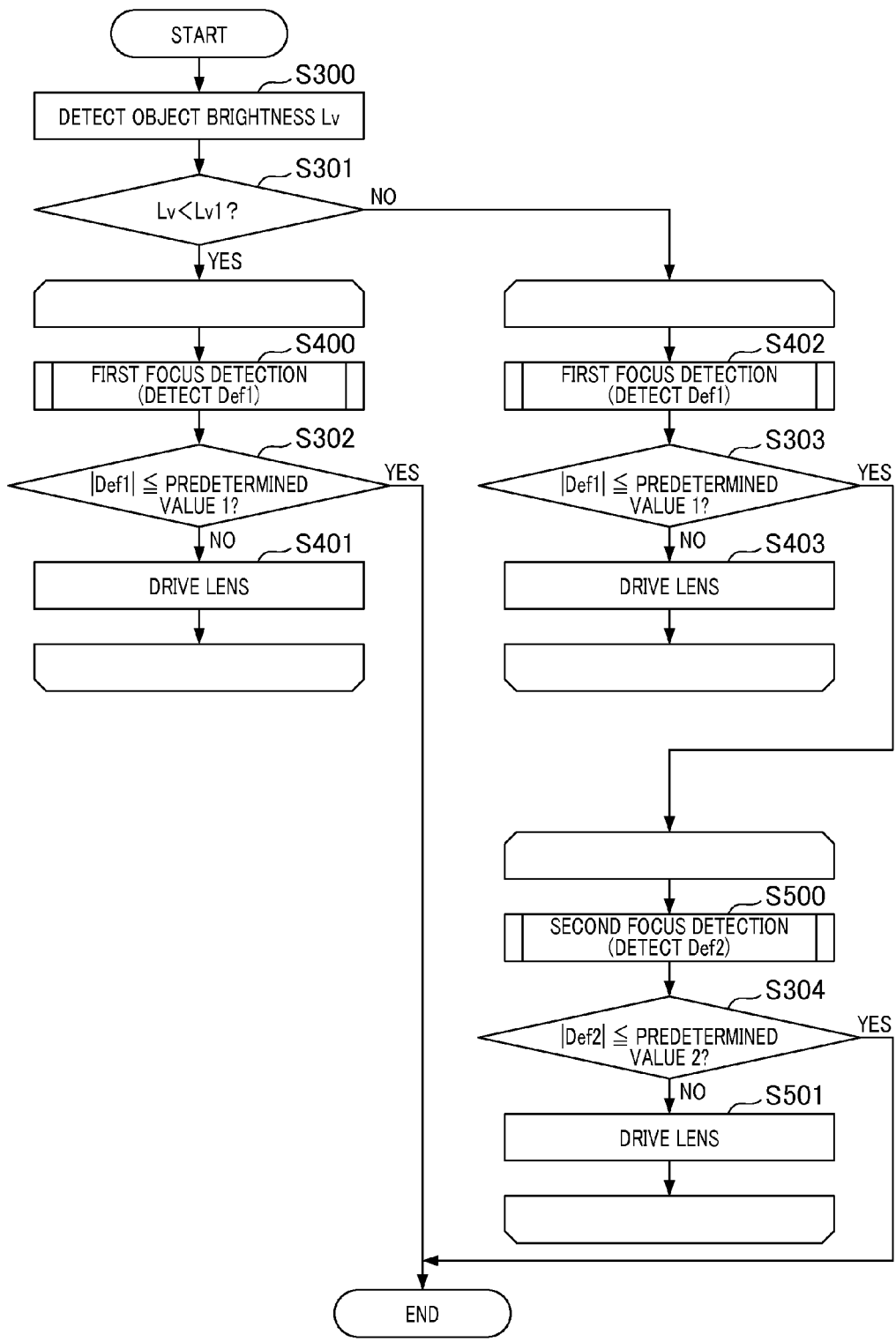
FIG. 18 is a flowchart illustrating focus detection processing corresponding to a brightness level.

FIG. 18 is a flowchart illustrating the flow of focus detection processing according to the present embodiment. The processing is realized by a program executed by the CPU 121.

If the object brightness is equal to or greater than a predetermined threshold value, the focus lens is driven based on the result of the first focus detection of the phase difference type until an absolute value of the defocus amount of the focusing optical system is equal to or less than the first threshold value (the predetermined value 1). In this manner, a focus adjustment operation is performed from the large-defocus state to the small-defocus state of the focusing optical system. Then, the focus lens is driven based on the result of the second focus detection of the refocus type until an absolute value of the defocus amount of the focusing optical system is equal to or less than the predetermined value 2 (<the predetermined value 1) which is the second threshold value. In this manner, a focus adjustment operation is performed from the small-defocus state to the vicinity of the best in-focus position of the focusing optical system. If the object brightness is less than a predetermined threshold value, the focus lens is driven based on the result of the first focus detection of the phase difference type until an absolute value of the defocus amount of the focusing optical system is equal to or less than the predetermined value 1. A focus adjustment operation is performed from the large-defocus state to the small-defocus state of the focusing optical system. Then, focus adjustment is completed without performing the second focus detection.

In step S300, the brightness detecting unit 1212 detects the object brightness (denoted by "Lv") of a captured image. The range for detecting the object brightness may be limited within the set AF range. In step S301, the object brightness Lv detected in step S300 is compared with a predetermined brightness level (denoted by "Lv1"). If the object brightness Lv is less than the brightness level Lv1 which may adversely affect on the AF result, the processing proceeds to step S400, whereas if the object brightness Lv is equal to or greater than the brightness level Lv1, the processing proceeds to step S402.

If the judging condition in step S302 is not met, the processing in steps S400 and S401 is executed as iteration processing. In step S400, the first detection amount (Def1) is detected based on the result of the first focus detection of the phase difference type. In step S302, the magnitude |Def1| of the first detection amount (Def1) is compared with the predetermined value 1. If |Def1| is greater than the predetermined value 1, the processing proceeds to step S401, whereas if |Def1| is equal to or less than the predetermined value 1, the focus adjustment operation ends. In step S401, the focus lens is driven in accordance with the first defocus amount (Def1), and the processing returns to step S400.

If the judging condition in step S303 is not met, the processing in steps S402 and S403 is executed as iteration processing. In step S402, the first detection amount (Def1) is detected based on the result of the first focus detection of the phase difference type. In step S303, the magnitude |Def1| of the first detection amount (Def1) is compared with the predetermined value 1. If |Def1| is greater than the predetermined value 1, the processing proceeds to step S403, whereas if |Def1| is equal to or less than the predetermined value 1, the processing shifts to step S500. In step S403, the focus lens is driven in accordance with the first detection amount (Def1), and the processing returns to step S402.

If the judging condition in step S304 is not met, the processing in steps S500 and S501 is executed as iteration processing. In step S500, the second detection amount (Def2) is detected based on the result of the second focus detection of the refocus type. In step S304, the magnitude |Def2| of the second detection amount (Def2) is compared with the predetermined value 2 (<the predetermined value 1). If |Def2| is greater than the predetermined value 2, the processing proceeds to step S501, whereas if |Def2| is equal to or less than the predetermined value 2, the focus adjustment operation ends. In step S501, the focus lens is driven in accordance with the second detection amount (Def2), and the processing returns to step S500.

As described above, the content of focus detection processing is changed based on the comparison result between the object brightness Lv and Lv1 (threshold value). The reason why the focus adjustment operation ends in step S302 when the magnitude |Def1| of the first detection amount (Def2) is equal to or less than the predetermined value 1 is to avoid an adverse effect of a low brightness condition on the second focus detection. At this point, the defocus amount still remains as compared with the best in-focus position to be reached after the processing in step S501. However, it can be determined that the best in-focus position has been reached under a low brightness condition, and thus, the focus adjustment operation ends when the judging condition in step S302 has been met. In contrast to the processing under the presence of a saturated signal described with reference to FIG. 17, the processing shown in FIG. 18 does not increase the filter passband. This is because high-frequency information included in an imaging signal under a low brightness condition is mainly a noise and thus low-frequency signal detection is rather effective. In the present embodiment, a focus adjustment operation to the final best in-focus position can be performed even under a low brightness condition which may cause a deterioration in accuracy of the second detection amount in the second focus detection.

According to the present embodiment, a focus state can be detected with accuracy by the sequence taking into account a condition which may cause a reduction in focus detection accuracy by the contrast evaluating unit, such as a condition of shooting a low-brightness object or including a saturated pixel.

Second Embodiment

Next, a description will be given of a second embodiment of the present invention. In the second embodiment, the same reference numerals already used are used for the same components as those in the first embodiment, and thus, a detailed description thereof will be omitted. Hereinafter, a description will be given of focus detection processing which is different from the first embodiment.

Figure 19:
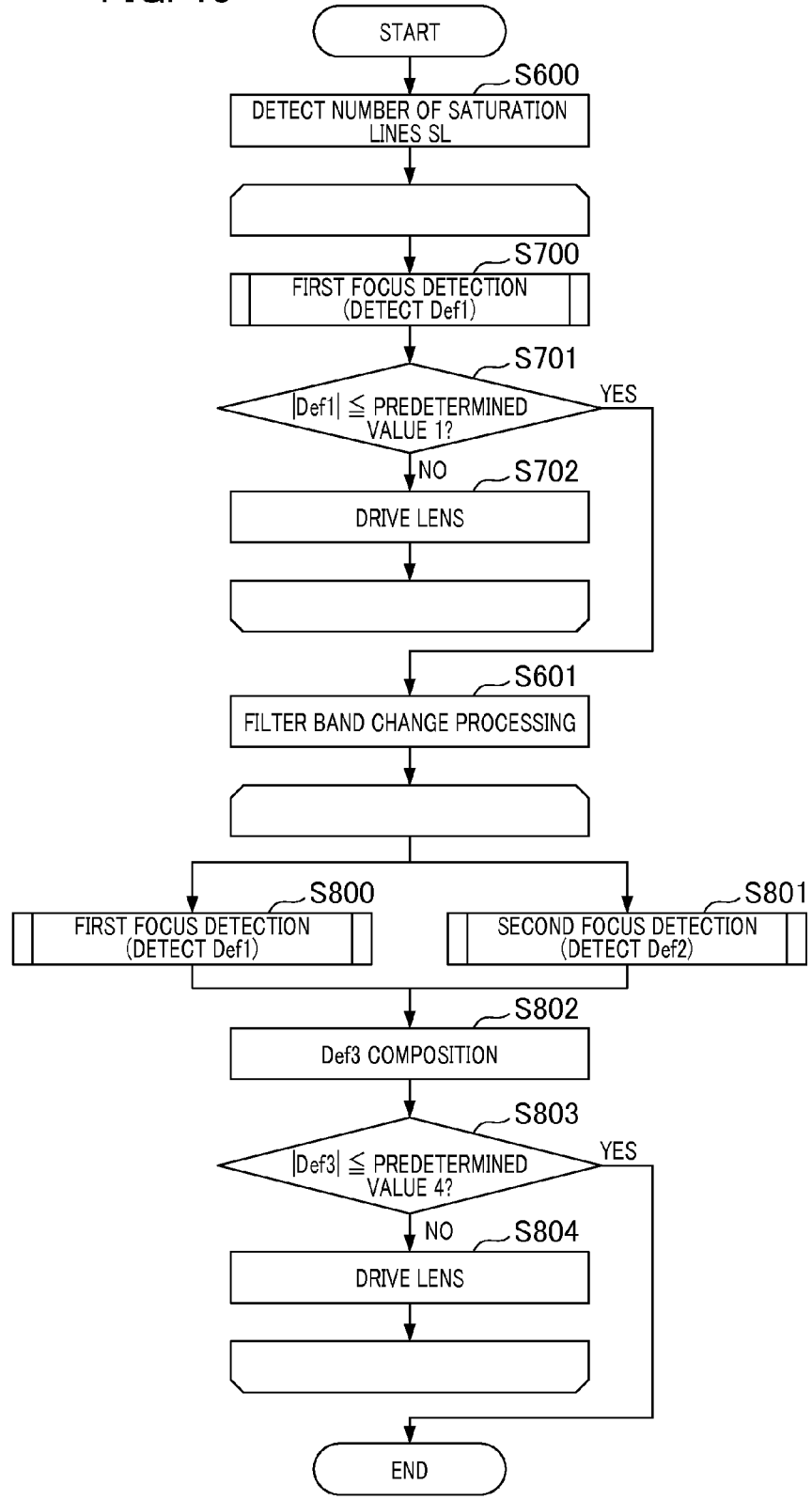
FIG. 19 is a flowchart illustrating focus detection processing corresponding to the number of lines including a saturated signal in order to explain a second embodiment of the present invention in conjunction with FIG. 20.

A description will be given of the focus detection processing when a saturated signal is included with reference to the flowchart shown in FIG. 19. The processing is realized by a program executed by the CPU 121.

In the present embodiment, the first focus detection of the phase difference type is performed until an absolute value of the defocus amount of the focusing optical system is equal to or less than the predetermined value 1 to thereby drive the focus lens. In this manner, a focus adjustment operation is performed from the large-defocus state to the small-defocus state of the focusing optical system. Then, the first detection amount and the second detection amount are weighted in accordance with the number of saturation lines SL to thereby generate a third detection defocus amount (hereinafter referred to as "third detection amount" which is denoted by "Def3"). A focus adjustment operation is performed until an absolute value of the generated third detection amount is equal to or less than the predetermined value 4 (<the predetermined value 1).

In step S600, the saturation detecting unit 1211 counts the number of saturation lines SL of a captured image. The processing is the same as that in step S010 shown in FIG. 17 but does not include the judgment processing in step S011, and the processing shifts to step S700. If the judging condition in step S701 is not met, the processing in steps S700 and S702 is executed as iteration processing. In step S700, the first detection amount (Def1) is detected based on the result of the first focus detection of the phase difference type. If it is determined by the judgment processing in step S701 that the magnitude |Def1| of the first detection amount (Def1) is greater than the predetermined value 1, the processing proceeds to step S702, whereas if |Def1| is equal to or less than the predetermined value 1, the processing proceeds to step S601. In step S702, the focus lens is driven in accordance with the first detection amount (Def1), and the processing returns to step S700.

As in step S013 shown in FIG. 17, filter band change processing is executed in step S601. In other words, in order to perform the third filter processing, the passband of the first filter processing in the first focus detection is set to a high-frequency equivalent to the passband of the second filter processing in the second focus detection. After step S601, the parallel processing in steps S800 and S801 is executed. In step S800, the first detection amount (Def1) is obtained from the result of the first focus detection of the phase difference type. In step S801, the second detection amount (Def2) is obtained from the result of the second focus detection of the refocus type. After the processing in steps S800 and S801, the processing proceeds to step S802, and the third detection amount (Def3) is calculated. The third detection amount (Def3) is calculated by the weighted average computation of the first detection amount (Def1) obtained in step S800 and the second detection amount (Def2) obtained in step S801 (Def3 composition). A weighted coefficient to be used upon weighted average computation is determined by the number of saturation lines SL detected in step S600. In other words, in the weighted average processing for calculating the third detection amount (Def3), the weighted value, i.e., the weighted coefficient value for the first detection amount (Def1) is set to be large with an increase in the value of the number of saturation lines SL detected in step S600. The reason for this is that a proportion occupied by the second detection amount is set to be small relative to that occupied by the first detection amount because of a reduction in the accuracy of the second detection amount in the second focus detection when there are many saturated signals.

In step S803, the magnitude |Def3| of the third detection amount which is the computation result of weighted average processing is compared with a predetermined value 4 (<the predetermined value 1). If |Def3| is greater than the predetermined value 4, the processing proceeds to step S804, whereas if |Def3| is equal to or less than the predetermined value 4, the focus adjustment operation ends. In step S804, the focus lens is driven in accordance with the third detection amount (Def3). If the judging condition in step S803 is not met, the processing in steps S800, S801, S802, and step S804 is executed as iteration processing.

In the present embodiment, highly-accurate focus detection can be achieved even under a condition including a saturation line which may cause a deterioration in accuracy of the second detection amount in the second focus detection.

Figure 20:
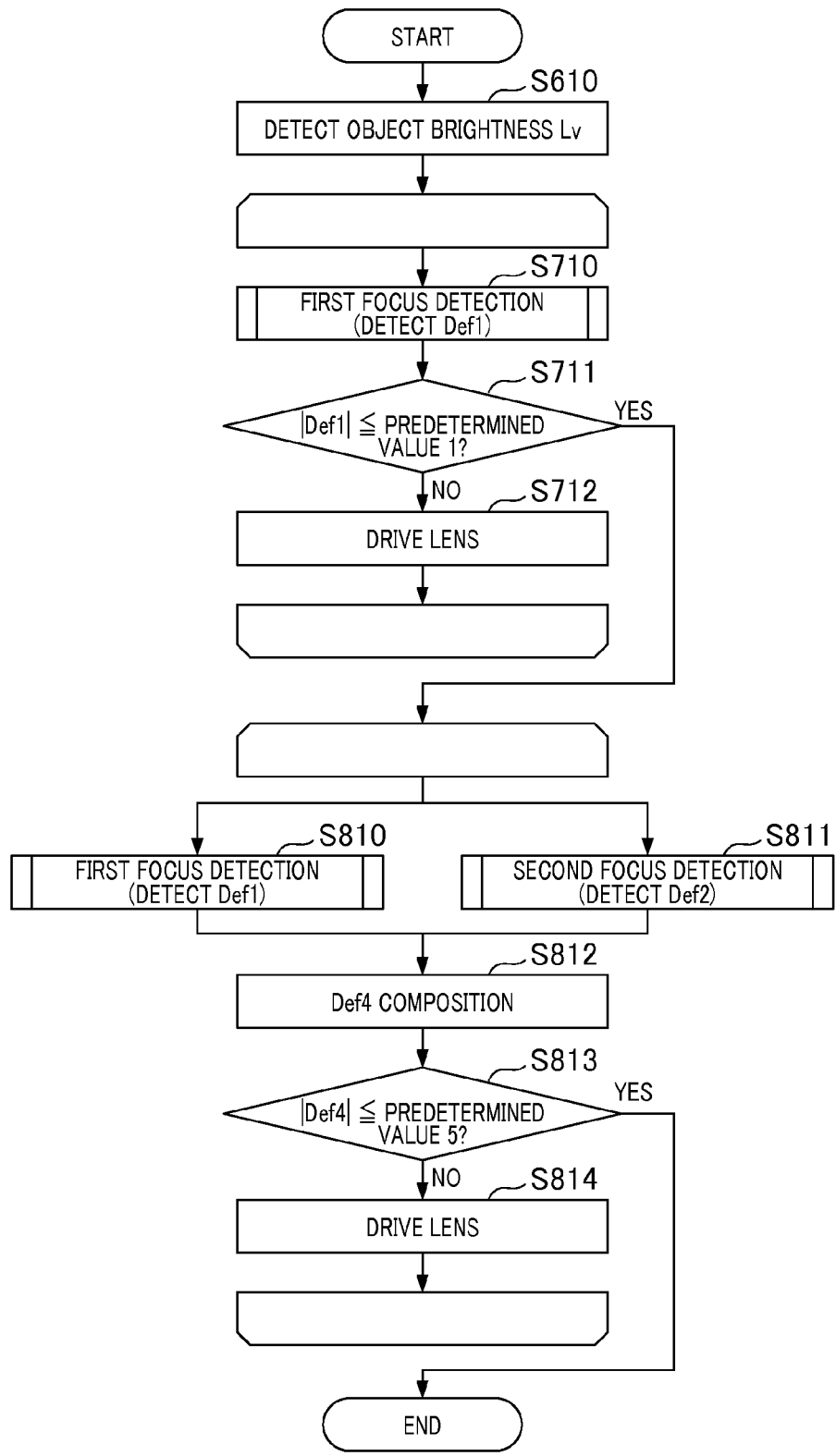
FIG. 20 is a flowchart illustrating focus detection processing corresponding to a brightness level.

Next, a description will be given of focus detection processing in the case of low brightness with reference to the flowchart shown in FIG. 20. The processing is realized by a program executed by the CPU 121.

In the present embodiment, the first focus detection of the phase difference type is performed until an absolute value of the defocus amount of the focusing optical system is equal to or less than the predetermined value 1 to thereby drive the focus lens. In this manner, a focus adjustment operation is performed from the large-defocus state to the small-defocus state of the focusing optical system. Then, a fourth detection defocus amount (Def4) is calculated in accordance with the object brightness Lv. The fourth detection defocus amount (Def4) is generated by the weighting processing using the first detection amount and the second detection amount. A focus adjustment operation is performed using the fourth detection defocus amount until an absolute value of the defocus amount of the focusing optical system is equal to or less than a predetermined value 5 (<the predetermined value 1).

As in step S300 shown in FIG. 18, the brightness detecting unit 1212 detects the object brightness Lv of a captured image in step S610. If the judging condition "|Def1|≤the predetermined value 1" is not met in step S711, the processing in steps S710 and S712 is executed as iteration processing. The first focus detection in step S710 and the lens drive processing in step S712 are the same as those in step S700 and step S702, respectively, in FIG. 19, and thus, explanation thereof will be omitted.

If the magnitude |Def1| of the first detection amount (Def1) is equal to or less than the predetermined value 1 in step S711, the processing proceeds to the parallel processing in steps S810 and S811. As in step S800 shown in FIG. 19, the first detection amount (Def1) is calculated based on the result of the first focus detection of the phase difference type in step S810. As in step S801 shown in FIG. 19, the second detection amount (Def2) is calculated based on the result of the second focus detection of the refocus type in step S811. After steps S810 and S811, the processing proceeds to step S812.

In step S812, the fourth detection defocus amount (Def4) is calculated. In other words, the weighted average computation of the first detection amount (Def1) and the second detection amount (Def2) is executed (Def4 composition). A weighted coefficient to be used upon weighted average computation is determined by the object brightness Lv detected in step S610. In the weighted average processing, the weighted value, i.e., the weighted coefficient value for the first detection amount (Def1) is set to be large with a decrease in the object brightness Lv. The reason for this is that a proportion occupied by the second detection amount is set to be small relative to that occupied by the first detection amount because of a reduction in the accuracy of the second detection amount in the second focus detection when the object brightness is low.

In the judgment processing in step S813, the magnitude |Def4| of the fourth detection defocus amount is compared with the predetermined value 5 (<the predetermined value 1). If |Def4| is greater than the predetermined value 5, the processing proceeds to step S814, whereas if |Def4| is equal to or less than the predetermined value 5, the focus adjustment operation ends. In step S814, the focus lens is driven in accordance with the first detection amount (Def3). If the judging condition in step S813 is not met, the processing in steps S810, S811, S812, and S814 is executed as iteration processing.

In the present embodiment, a focus adjustment operation to the final best in-focus position can be performed even under a low brightness condition which may cause a deterioration in accuracy of the second detection amount in the second focus detection, i.e., under a low brightness condition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-001065, filed on Jan. 7, 2014, which is hereby incorporated by reference herein in its entirety.

What is claimed is:

1. An imaging apparatus comprising:
    an imaging device that outputs a parallax image of a first image signal and a second image signal;
    a first focus detecting unit configured to calculate a defocus amount by a phase-difference detection method using the first image signal and the second image signal;
    a second focus detecting unit configured to calculate a contrast evaluation value based on a combined signal, wherein the combined signal is a signal obtained by relatively shifting phases of the first and second image signals and combining the first and second image signals;
    a brightness detecting unit configured to detect the brightness level of an object, and a control unit configured to, when the brightness level of the object detected by the brightness detecting unit is within a first range, the control unit controls a focus adjustment operation using the result of the first focus detecting unit, whereas when the brightness level of the object detecting by the brightness detecting unit is within a second range indicating the brightness level of the object detected by the brightness detecting unit is greater than a brightness level of an object detected by the brightness detecting unit within the first range, the control unit controls the focus adjustment operation using the results of both the first and second focus detecting units.

2. The imaging apparatus according to claim 1, wherein the imaging device has a plurality of focus detecting pixels for receiving light passing through differential partial pupil areas of a focusing optical system,
    wherein the first image signal is output from a first focus detecting pixel for receiving light passing through a first partial pupil area of the focusing optical system, and the second image signal is output from a second focus detecting pixel for receiving light passing through a second partial pupil area, which is different from the first partial pupil area.

3. A control method to be executed by an imaging apparatus comprising an imaging device that outputs a parallax image of a first image signal and a second image signal, the method comprising:
    detecting, by a brightness detecting unit, the brightness of an object; and
    calculating, by a first focus detecting unit, a defocus amount by a phase-difference detection method using the first image signal and the second image signal when the brightness level of the object detected by the brightness detecting unit is within a first range, and controlling, by a control unit, a focus adjustment operation using the result of the first focus detecting unit, whereas when the brightness level of the object detected by the brightness detecting unit is within a second range indicating the brightness level of the object detected by the brightness detecting unit is greater than a brightness level of an object detected by the brightness detecting unit within the first range, the first focus detecting unit calculates a defocus amount by a phase-difference detection method using the first image signal and the second image signal, and a second focus detecting unit calculates a contrast evaluation value based on a combined signal, wherein the combined signal is a signal obtained by relatively shifting phases of the first and second image signals and combining the first and second image signals, and then the control unit controls the focus adjustment operation using the results of both the first and second focus detecting units.

4. The imaging apparatus according to claim 1, wherein the brightness detecting unit is configured to detect the brightness of an object from an image captured by the imaging device.

5. The imaging apparatus according to claim 1, wherein the control unit is configured to, when the brightness level of the object detected by the brightness detecting unit is less than a threshold value, the control unit controls the focus adjustment operation using the result of the first focus detecting unit, whereas when the brightness level of the object detected by the brightness detecting unit is equal to or greater than a threshold value, the control unit controls the focus adjustment operation using the results of the first and second detecting unit.

* * * * *